(12) United States Patent
Fang et al.

(10) Patent No.: US 12,199,791 B2
(45) Date of Patent: *Jan. 14, 2025

(54) HOSPITALITY PROPERTY MANAGEMENT TOOL AND SYSTEM AND METHOD FOR USE OF SAME

(71) Applicant: Enseo, LLC, Plano, TX (US)

(72) Inventors: William C. Fang, Plano, TX (US); Thomas R. Miller, Plano, TX (US); Vanessa Ogle, Fairview, TX (US)

(73) Assignee: Enseo, LLC, Plano, TX (US)

( * ) Notice: Subject to any disclaimer, the term of this patent is extended or adjusted under 35 U.S.C. 154(b) by 494 days.

This patent is subject to a terminal disclaimer.

(21) Appl. No.: 17/545,344

(22) Filed: Dec. 8, 2021

(65) Prior Publication Data
US 2022/0103392 A1 Mar. 31, 2022

Related U.S. Application Data

(63) Continuation-in-part of application No. 16/881,968, filed on May 22, 2020, now Pat. No. 11,336,478.
(Continued)

(51) Int. Cl.
| | |
|---|---|
| *H04L 12/28* | (2006.01) |
| *H04N 7/10* | (2006.01) |
| *H04N 7/173* | (2011.01) |
| *H04N 21/214* | (2011.01) |
| *H04N 21/41* | (2011.01) |

(Continued)

(52) U.S. Cl.
CPC ........ *H04L 12/282* (2013.01); *H04L 12/2814* (2013.01); *H04L 12/2829* (2013.01); *H04L 12/2832* (2013.01); *H04N 7/106* (2013.01); *H04N 7/17354* (2013.01);
(Continued)

(58) Field of Classification Search
CPC .............. H04L 12/282; H04L 12/2814; H04L 12/2829; H04L 12/2832; H04N 7/106; H04N 7/17354; H04N 21/2143; H04N 21/4131; H04N 21/43615; H04N 21/4622
See application file for complete search history.

(56) References Cited

U.S. PATENT DOCUMENTS 5,661,517 A * 8/1997 Budow ............... G07F 17/0014
725/60
5,664,174 A * 9/1997 Agrawal ............. G06F 16/2474
707/999.005

(Continued)

*Primary Examiner* — Ramesh B Patel
(74) *Attorney, Agent, or Firm* — Scott Griggs; Griggs Bergen LLP

(57) ABSTRACT

A hospitality property management tool and system and method for use of the same are disclosed. In one embodiment of the system, thermostats are located in respective rooms at a hospitality establishment. The thermostats are joined in network communication with environmental amenities, such as lights and a thermostat that respectively controls lighting and temperature. The thermostats utilize an unoccupied room profile and an occupied room profile to set the environmental conditions, such as the lighting and the temperature, in the rooms. A guest preference profile may be activated within a room to provide guest-specific environmental conditions in the room associated with a guest.

21 Claims, 11 Drawing Sheets

Related U.S. Application Data which is a continuation of application No. 16/126,607, filed on Sep. 10, 2018, now Pat. No. 10,666,452.

(60) Provisional application No. 63/128,817, filed on Dec. 21, 2020, provisional application No. 62/555,672, filed on Sep. 8, 2017.

(51) Int. Cl.
  *H04N 21/436* (2011.01)
  *H04N 21/462* (2011.01)

(52) U.S. Cl.
  CPC ..... *H04N 21/2143* (2013.01); *H04N 21/4131* (2013.01); *H04N 21/43615* (2013.01); *H04N 21/4622* (2013.01)

(56) References Cited

U.S. PATENT DOCUMENTS

| | | | |
|---|---|---|---|
| 5,675,788 A * | 10/1997 | Husick | G06F 16/40 715/204 |
| 5,742,816 A * | 4/1998 | Barr | G06F 16/48 715/204 |
| 5,842,200 A * | 11/1998 | Agrawal | G06Q 30/02 |
| 6,029,176 A * | 2/2000 | Cannon | G06Q 30/02 348/E7.063 |
| 6,286,005 B1 * | 9/2001 | Cannon | G06Q 30/0201 455/2.01 |
| 6,854,010 B1 * | 2/2005 | Christian | H04L 63/0272 709/219 |
| 7,328,166 B1 * | 2/2008 | Geoghegan | G06Q 10/02 705/5 |
| 8,112,295 B1 * | 2/2012 | Parker | G06Q 30/02 705/5 |
| 9,088,828 B2 * | 7/2015 | Ogle | H04N 21/25 |
| 9,326,009 B2 | 4/2016 | Ogle et al. | |
| 9,332,304 B2 | 5/2016 | Ogle et al. | |
| 9,344,757 B2 | 5/2016 | Ogle et al. | |
| 9,357,254 B2 | 5/2016 | Ogle et al. | |
| 9,560,388 B2 | 1/2017 | Ogle et al. | |
| 9,654,826 B2 | 5/2017 | Ogle et al. | |
| 9,654,827 B2 | 5/2017 | Ogle et al. | |
| 9,710,987 B2 * | 7/2017 | Scoggins | G07C 9/28 |
| 9,712,872 B2 | 7/2017 | Ogle et al. | |
| 9,800,932 B2 | 10/2017 | Ogle et al. | |
| 9,832,489 B2 | 11/2017 | Ogle et al. | |
| 9,832,490 B2 | 11/2017 | Ogle et al. | |
| 10,091,534 B2 | 10/2018 | Ogle et al. | |
| 10,104,402 B2 | 10/2018 | Ogle et al. | |
| 10,142,662 B2 | 11/2018 | Ogle et al. | |
| 10,405,008 B2 * | 9/2019 | Fang | H04N 21/8126 |
| 10,462,881 B1 | 10/2019 | Hammet | |
| 10,666,452 B2 * | 5/2020 | Miller | H04L 12/2829 |
| 11,336,478 B2 * | 5/2022 | Miller | H04L 12/2814 |
| 11,855,798 B2 * | 12/2023 | Miller | H04L 12/2832 |
| 2005/0144642 A1 * | 6/2005 | Ratterman | H04N 21/4882 348/E7.071 |
| 2007/0050197 A1 * | 3/2007 | Efron | G06Q 10/02 705/26.1 |
| 2007/0287498 A1 | 12/2007 | Wang | |
| 2009/0313053 A1 * | 12/2009 | Gengarella | G06Q 10/02 705/5 |
| 2010/0250707 A1 * | 9/2010 | Dalley | G06Q 30/0202 709/219 |
| 2011/0099575 A1 | 4/2011 | Woo et al. | |
| 2013/0080542 A1 | 3/2013 | Peng | |
| 2013/0086245 A1 | 4/2013 | Lu | |
| 2013/0328909 A1 * | 12/2013 | Pacheco | G09G 5/02 345/593 |
| 2013/0346564 A1 | 12/2013 | Warrick | |
| 2015/0256355 A1 | 9/2015 | Pera | |
| 2017/0142449 A1 | 5/2017 | Ogle et al. | |
| 2017/0156076 A1 | 6/2017 | Eom | |
| 2018/0077459 A1 | 3/2018 | Ogle et al. | |
| 2018/0084285 A1 | 3/2018 | Ogle et al. | |
| 2018/0110093 A1 | 4/2018 | Deros | |
| 2018/0167228 A1 | 6/2018 | Elcock | |
| 2018/0167516 A1 | 6/2018 | Warrick | |
| 2018/0211666 A1 | 7/2018 | Kolavennu | |
| 2018/0220476 A1 | 8/2018 | Jung | |
| 2018/0249188 A1 * | 8/2018 | Fang | H04N 21/2143 |
| 2018/0270510 A1 * | 9/2018 | Fang | H04N 21/8126 |
| 2019/0037248 A1 | 1/2019 | Ogle et al. | |
| 2019/0045229 A1 | 2/2019 | Ogle et al. | |
| 2019/0058586 A1 | 2/2019 | Kumar | |
| 2019/0098340 A1 | 3/2019 | Ogle et al. | |
| 2019/0190992 A1 | 6/2019 | Warrick | |
| 2019/0273749 A1 | 9/2019 | Nishimoto | |
| 2019/0342112 A1 | 11/2019 | Li | |
| 2019/0342942 A1 | 11/2019 | Deros | |
| 2020/0037004 A1 | 1/2020 | Fang | |
| 2020/0137453 A1 | 4/2020 | Fang | |
| 2020/0213158 A1 | 7/2020 | Fang et al. | |
| 2020/0287726 A1 | 9/2020 | Garnier et al. | |
| 2022/0103391 A1 * | 3/2022 | Fang | H04L 12/2814 |
| 2024/0146571 A1 * | 5/2024 | Miller | H04L 12/2814 |

* cited by examiner

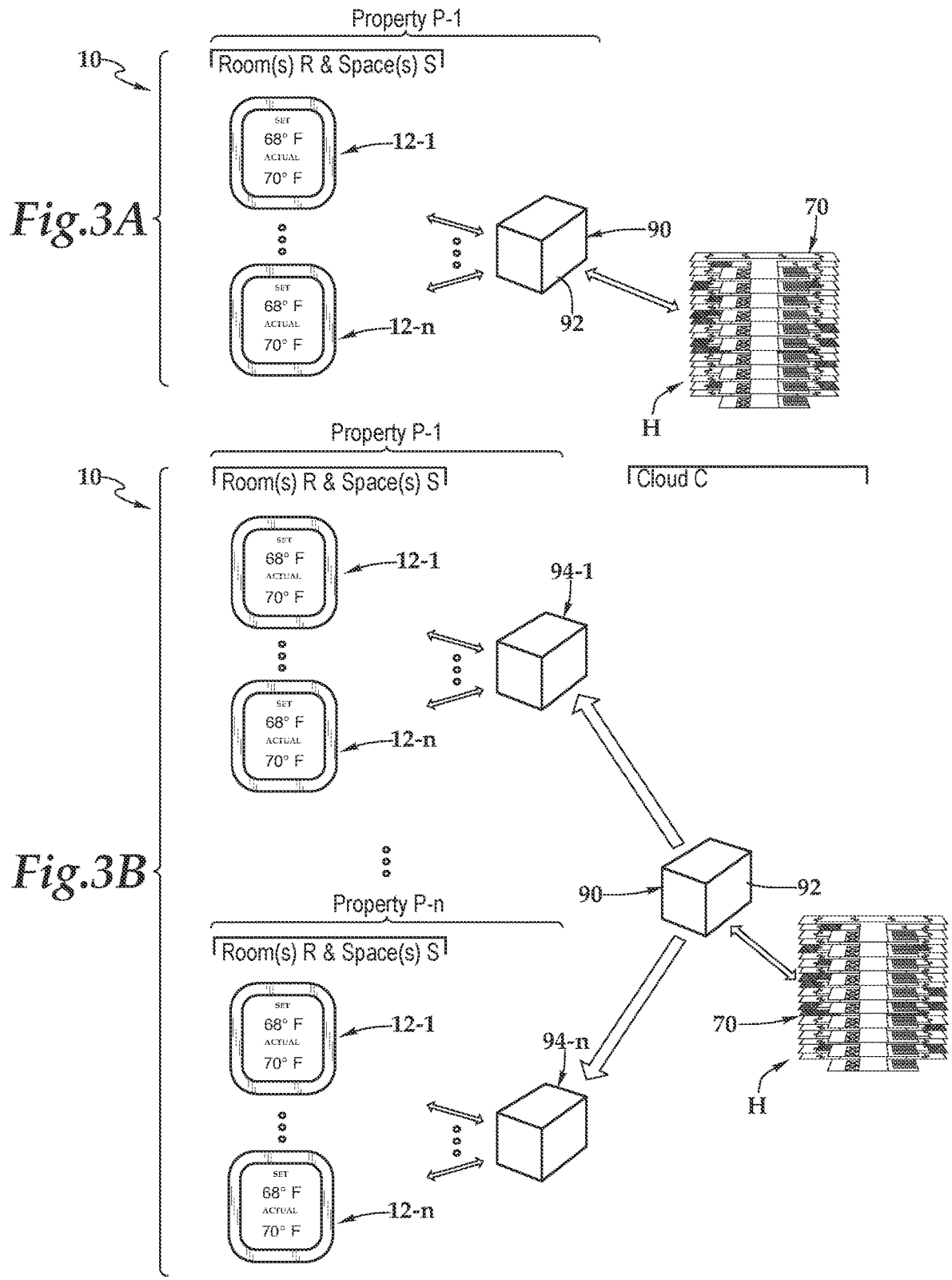

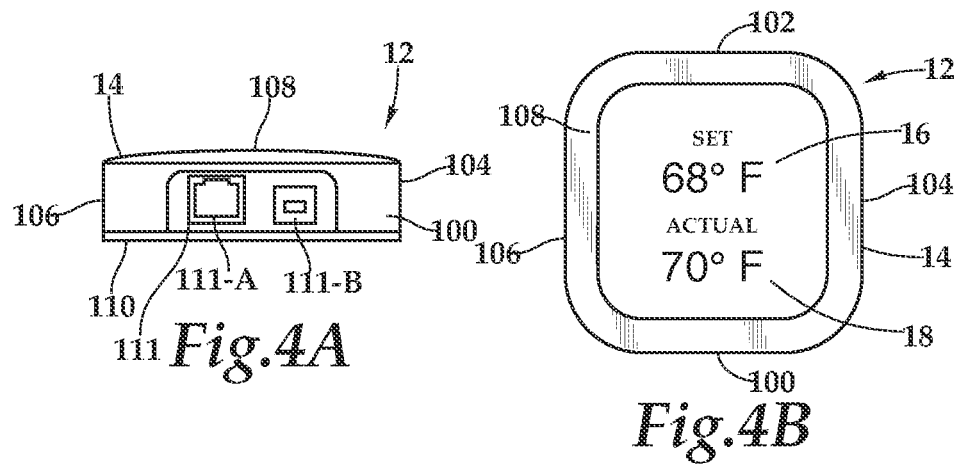
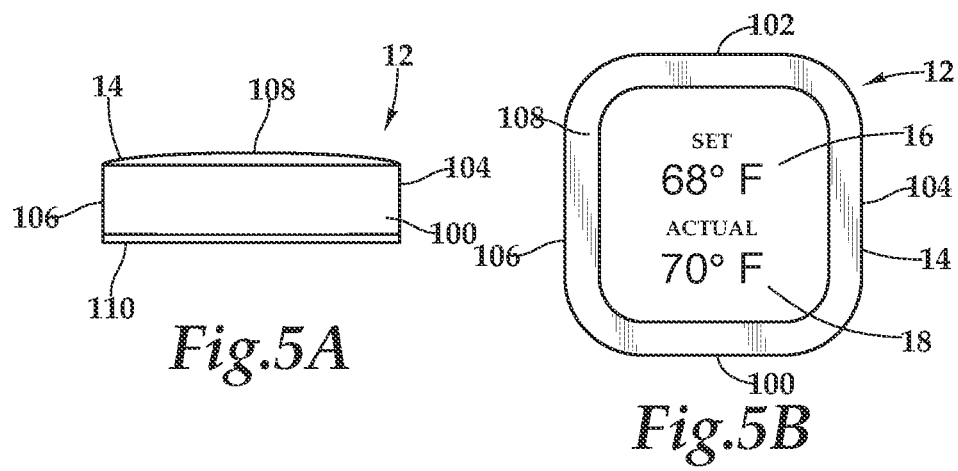
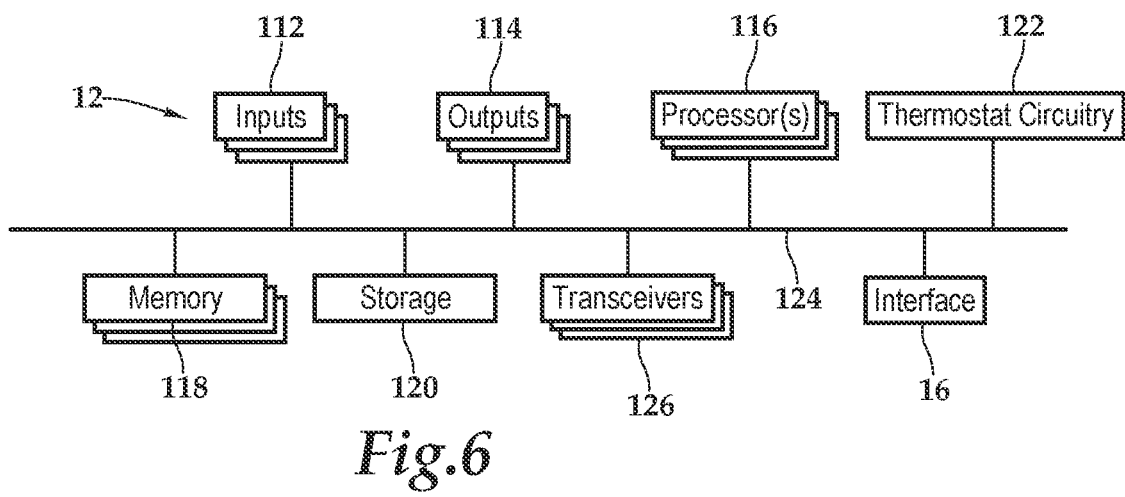
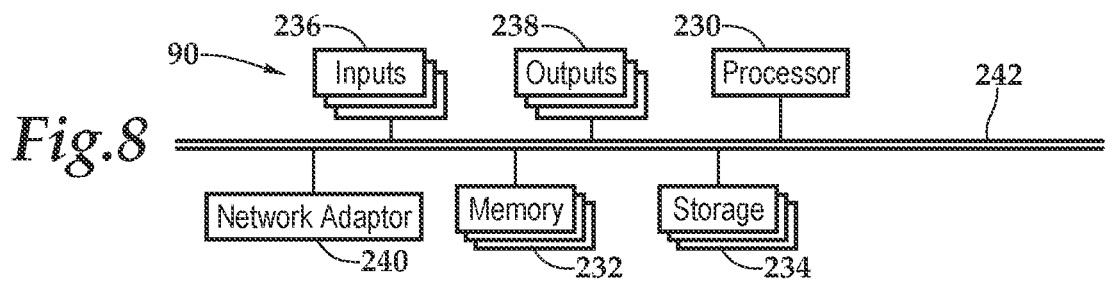

HOSPITALITY PROPERTY MANAGEMENT TOOL AND SYSTEM AND METHOD FOR USE OF SAME

PRIORITY STATEMENT & CROSS-REFERENCE TO RELATED APPLICATION

This application claims priority from co-pending U.S. patent application Ser. No. 63/128,817 entitled "Hospitality Property Management Tool and System and Method for Use of Same" filed on Dec. 21, 2020, in the name of William C. Fang; which is hereby incorporated by reference, in entirety, for all purposes. This application is also a continuation-in-part of U.S. patent application Ser. No. 16/881,968 entitled "Hospitality Property Management Tool and System and Method for Use of Same" filed on May 22, 2020, in the names of Thomas R. Miller et al.; which is a continuation of U.S. patent application Ser. No. 16/126,607 entitled "Hospitality Property Management Tool and System and Method for Use of Same" filed on Sep. 10, 2018, in the names of Thomas R. Miller et al, now U.S. Pat. No. 10,666,452 and issued on May 26, 2020; which claims the benefit of U.S. patent application Ser. No. 62/555,672 entitled "Hospitality Property Management Tool and System and Method for Use of Same" filed on Sep. 8, 2017, in the name of Vanessa Ogle et al.; all of which are hereby incorporated by reference, in entirety, for all purposes.

This application discloses subject matter related to the subject matter disclosed in the following commonly owned, co-pending U.S. patent application Ser. No. 17/545,261 entitled "Hospitality Property Management Tool and System and Method for Use of Same" and filed on Dec. 8, 2021, in the name of William C. Fang; which is hereby incorporated by reference, in entirety, for all purposes.

TECHNICAL FIELD OF THE INVENTION

This invention relates, in general, to the management of hospitality real estate and, in particular, to property management tools and systems and methods for use of the same for operation, control, and oversight of hospitality properties, such as lodging establishments, motels, or hotels, for example.

BACKGROUND OF THE INVENTION

Without limiting the scope of the present invention, the background will be described in relation to property management in the hospitality industry, as an example. Property management in the hospitality industry requires a need for the asset to be cared for, monitored, and accountability given for its useful life and condition. As property portfolios grow in the hospitality industry, processes, systems, and human resources required to manage the lifecycle of all acquired property increases in complexity. As a result of limitations in existing technology, there is a need for improved systems and methods of providing understanding and visibility into the management of hospitality environments.

SUMMARY OF THE INVENTION

It would be advantageous to achieve understanding and visibility into the management of hospitality environments. It would also be desirable to enable a computer-based solution that would enable property management tools to improve the operation, control, and oversight of hospitality properties, such as lodging establishments, motels, or hotels. To better address one or more of these concerns, property management tools and systems and methods for use of the same, are disclosed that are applicable to the hospitality industry. In one embodiment of the system, thermostats are located in respective rooms at a hospitality establishment. The thermostats are joined in network communication with environmental amenities, such as lights and shading that respectively control interior lighting and ambient lighting. The thermostats utilize an unoccupied room profile and occupied room profile to set the environmental conditions, such as lighting and temperature, in the rooms. A guest preference profile may be activated within a room to provide guest-specific environmental conditions in the room associated with the guest.

In another embodiment of the system, thermostats are located in respective rooms at a property. The thermostats are joined in network communication with environmental amenities, such as lights and shading that respectively control interior lighting and ambient lighting. The thermostats utilize an unoccupied room profile and an occupied room profile to set the environmental conditions, such as lighting and temperature, in the rooms. A preference profile may be activated within a room to provide individual-specific environmental conditions in the room associated with the individual, which may be an occupant, for example. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3A is a schematic diagram depicting one embodiment of the system presented in FIG. 1A and FIG. 1B within an on-property deployment;

FIG. 3B is a schematic diagram depicting one embodiment of the system presented in FIG. 1A and FIG. 1B within a cloud-computing deployment;

FIG. 4A is a front elevation view of one embodiment of the thermostat depicted in FIG. 1A and FIG. 1B in further detail;

FIG. 4B is a top plan view of the thermostat depicted in FIG. 4A;

FIG. 5A is a front elevation view of another embodiment of a thermostat, according to the teachings presented herein;

FIG. 5B is a top plan view of the thermostat depicted in FIG. 5A;

FIG. 6 is a functional block diagram depicting one embodiment of the thermostat presented in FIG. 1A and FIG. 1B;

FIG. 8 is a functional block diagram depicting one embodiment of a server presented in FIGS. 3A and 3B;

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
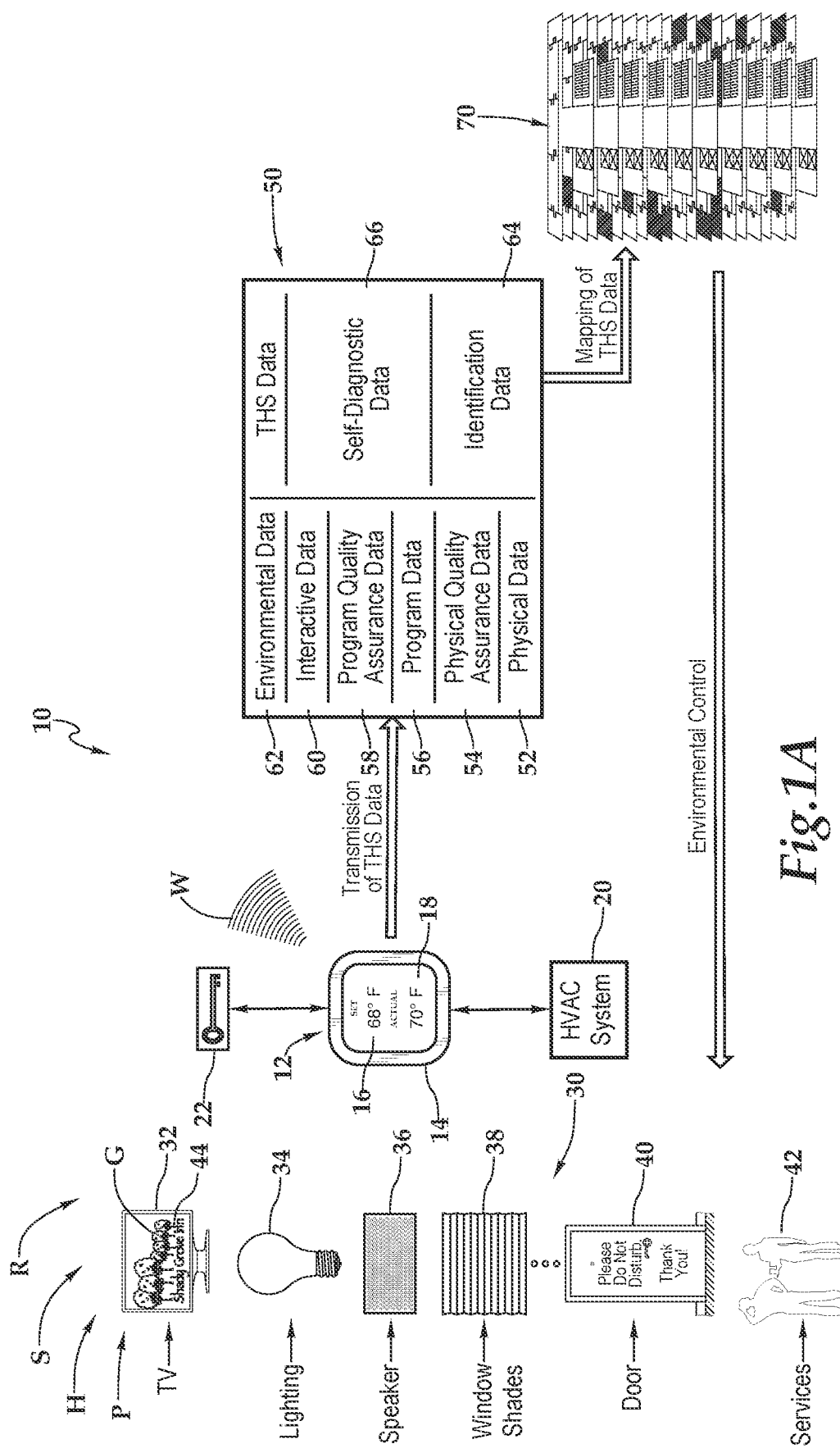
FIG. 1A is a schematic diagram depicting one embodiment of a system for providing hospitality property management according to the teachings presented herein.
Figure 1B:
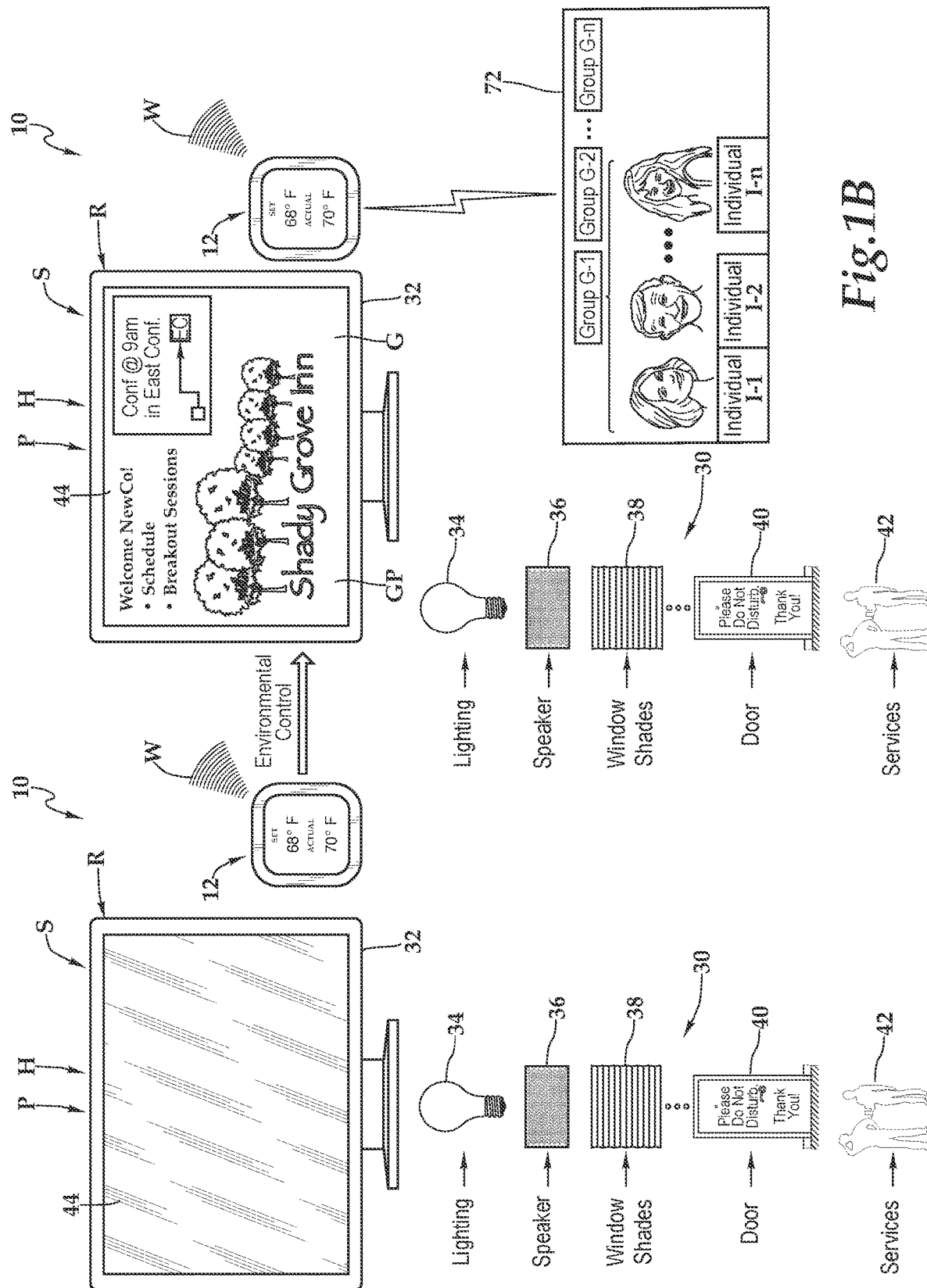
FIG. 1B is also a schematic diagram depicting one embodiment of the system for providing hospitality property management presented in FIG. 1A.

Referring initially to FIG. 1A and FIG. 1B, therein is depicted one embodiment of a system 10 for the management of a property P. The property P may include hospitality environments, educational campuses, hospital campuses, office buildings, multi-unit dwellings, sport facilities, and shopping malls, whether a single story, multiple stories, or a combination thereof, for example. As shown, by way of example and not by way of limitation, the property P is depicted as a hospitality establishment H and particularly a hotel having various rooms, including a space S, which may be a room R. A thermostat 12 monitors and controls heating and cooling in the space S or the room R to a setpoint temperature. The thermostat 12 may also be communicatively disposed with various amenities associated with the hospitality environment as discussed below, and has a housing 14 with, in one embodiment, an interface 16 providing temperature data 18, such as a setpoint temperature [shown as 68° F. (20° C.)] and an actual temperature [shown as 70° F. (21° C.)]. Wiring may provide a connection from the thermostat to an HVAC system 20, as shown in more detail in FIG. 7. A configuration profile 22 provides the information and credentials necessary for the thermostat 12 to have convenient connections to various amenities 30. Multiple antennas may provide for the wireless capabilities of the thermostat 12 and include, for example, a wireless communication W, which may utilize a wireless standard, such as Wi-Fi, Bluetooth, and ZigBee. More generally, it should be appreciated that the cabling connected to the thermostat 12 and antenna configuration will depend on the environment and application and the cabling connections and wireless standards presented in FIGS. 1A and 1B are depicted for illustrative purposes.

That is, the thermostat 12 may communicate wirelessly with the various amenities 30, which are depicted as environmental and service amenities, within and for an environment, such as the space S. As shown, the amenities may include a television 32, lighting 34, a speaker 36, window shades 38, a door 40, which is depicted as a door indication for "Please Do Not Disturb," and services 42, which may include repair services, delivery services, or housekeeping services, for example. As shown, the television 32 is depicted as a television having a screen 44, which is showing a guest welcoming portal G. It should be appreciated however, that the television 32 may also be a conventional television set or any electronic visual display device, for example. Thermostats, like the thermostat 12, may be deployed throughout the rooms R and spaces S of the hospitality establishment H and, more generally, the thermostats may be deployed throughout the property P.

The thermostat 12 collects various thermostat data including physical data 52, physical quality assurance data 54, program data 56, program quality assurance data 58, interactive data 60, and environmental data 62. Additionally, the thermostat data 50 includes identification data 64 identifying the thermostat 12 as well as self-diagnostic data 66. In one embodiment, the physical data 52 includes the actual hardware specifications and arrangement of wired connections at the time of installation, including information and data on the HVAC system 20. The physical quality assurance data 54 may be physical state data relating to a current condition of the hardware and wired connections. The program data 56 may include information about the system software that engages the thermostats' hardware and information about the application software that provides functionality relating to a guest's or hotel's interest, for example. The program quality assurance data 58 may be software state data relating to the current operations of the system software and the application software. In one embodiment, the interactive data 60 includes information about the interactions of the guest, or more generally, an individual, with the thermostat. The environmental data 62 includes information about the non-interactions with the thermostat 12, such as heating cycle data, cooling cycle data, or setpoint temperature data, for example. In one implementation, the identification data 64 may include the location of the thermostat 12 as well as other information derived from the physical data 52 and the program data 56, which identifies the thermostat 12. The self-diagnostic data relates to an application running automatically at a regular interval or continuously, for example, that detects faults—typically before becoming serious—in the physical data 52, the physical quality assurance data 54, the program data 56, the program quality assurance data 58, the interactive data 60, or the environmental data 62, for example.

By way of example, and not by way of limitation, the physical data 52 may be processor specifications, memory specifications, storage specifications, wireless specifications, firmware versions, connection to display by type, connection to display by model number, network addressing, MAC addresses, or the like. The physical quality assurance data 54 may be online/offline status, power state, display control status, connection status, interface status, control interface status, memory usage, unit up-time, hardware installation progress, or the like. The program data 56 may be user interface software version, operating system version, settings version, welcome menu version, and software configuration, or the like. The program quality assurance data 58 may be program guide status, debug console log, software usage, and software installation progress, or the like. The interactive data 60 may be guest configuration data, television channel viewing, program viewing, internet history, program guide interaction, or the like. The environmental data 62 may be amenity interaction, lighting status, thermostat status, window shades status, door status, or the like. The identification data 64 may be the serial number and addressing information gathered from the physical data 50, software identification information gathered from the program data 56, room number assigned to the thermostat 12, or the like. The self-diagnostic data 66 may be percent online, display output errors, self-test results, thermostat health reports, or the like.

As will be discussed in further detail hereinbelow, a map view 70 of the hospitality establishment H, including the room R, may be rendered by the system 10 as part of and following the collection of the thermostat data 50. The map view 70 may be utilized in association with establishing the environmental conditions within the hospitality establishment. More particularly, in one operational embodiment of the system, as discussed, the thermostat 12 stores various types of thermostat data 50 and transmits the thermostat data 50. The system 10 receives and stores the thermostat data 50. The system 10 may render the map view 70 of the hospitality establishment based on obtained map data, as will be discussed in more detail hereinbelow. The map view 70 may include a graphical representation of the room R and other rooms at the hospitality establishment. The system 10 may annotate the graphical representation of the room R with at least a portion of the thermostat data 50.

In one implementation, the set environmental conditions across multiple properties P may be monitored and controlled through the map view 70. More specifically, with reference to FIG. 2, the thermostat 12 utilizes an unoccupied room profile 74 and an occupied room profile 76 to set the environmental conditions, such as the lighting 34 and temperature, in the rooms R. The thermostat 12 is joined in network communication with the amenities 30, which are environmental amenities that may control the television 32, the lighting 34, the speaker 36, the window shades 38, and the door 40, as well as the services 42 in addition to monitoring and controlling the heating and cooling. The thermostat 12 uses the joined network communication with the amenities 30 to send environmental control information to the amenities 30 consistent with the environmental profile, such as the unoccupied room profile 74. As shown, the room R is unoccupied and an unoccupied room profile 74 sets the environmental conditions until the room is occupied, at which time a preference profile, shown as a guest preference profile 72, sets the environmental conditions. The preference profile may be activated within the room R to provide individual-specific environmental conditions in the room R associated with the individual, which may be an individual occupying the room temporarily or more permanently. In the particular embodiment shown, the guest preference profile 72, which is more generally a preference profile, may be activated within the room R to provide guest-specific environmental conditions in the room R associated with the guest. The guest preference profile 72 has information about the guest preferences for one or more of the environmental conditions. The thermostat 12 uses the joined network communication with the amenities 30 to send environmental control information to the amenities 30 consistent with the environmental profile, such as the guest preference profile 72. It should be appreciated that the guest preference profile 72 may be populated with some data of the occupied room profile 76 if the guest has not expressed a preference.

With respect to the guest preference profile 72, the guest individual $I_1$ is part of Group G-1, as opposed to Groups G-2 through G-n. As shown, Group G-1 includes multiple individuals such as the individual $I_1$ and an individual $I_2$ through an individual $I_n$. These individuals, the individual $I_1$ and the individual $I_2$ through the individual $I_n$, have a common hospitality aspect such as group travel relative to the hospitality establishment, group meeting accommodations relative to the hospitality establishment, or group event accommodations relative to the hospitality establishment, for example. Based on the common hospitality aspect, custom content is provided to the television 32 from the thermostat $I_2$. In the instant example in FIG. 1B, the individuals, including individual $I_1$, of Group G-1 are all part of a group called "NewCo" and are attending a conference and have a specific schedule with breakout sessions. The events are occurring in the east conference room at 9 am as shown in a custom guest preference content GP. As previously mentioned, with respect to the custom guest preference content GP, the guest preference profile 72 is located within the thermostat or, alternatively, the guest preference profile 72 is accessible by the thermostat 12 at a server (e.g., a server in FIGS. 3A and 3B). Further, individuals may be associated with particular groups at the time of room reservation, event reservation, room check-in, or event check-in, for example with an individual's proximate wireless-enabled programmable device being associated with the individual at the same time, for example.

Figure 2:
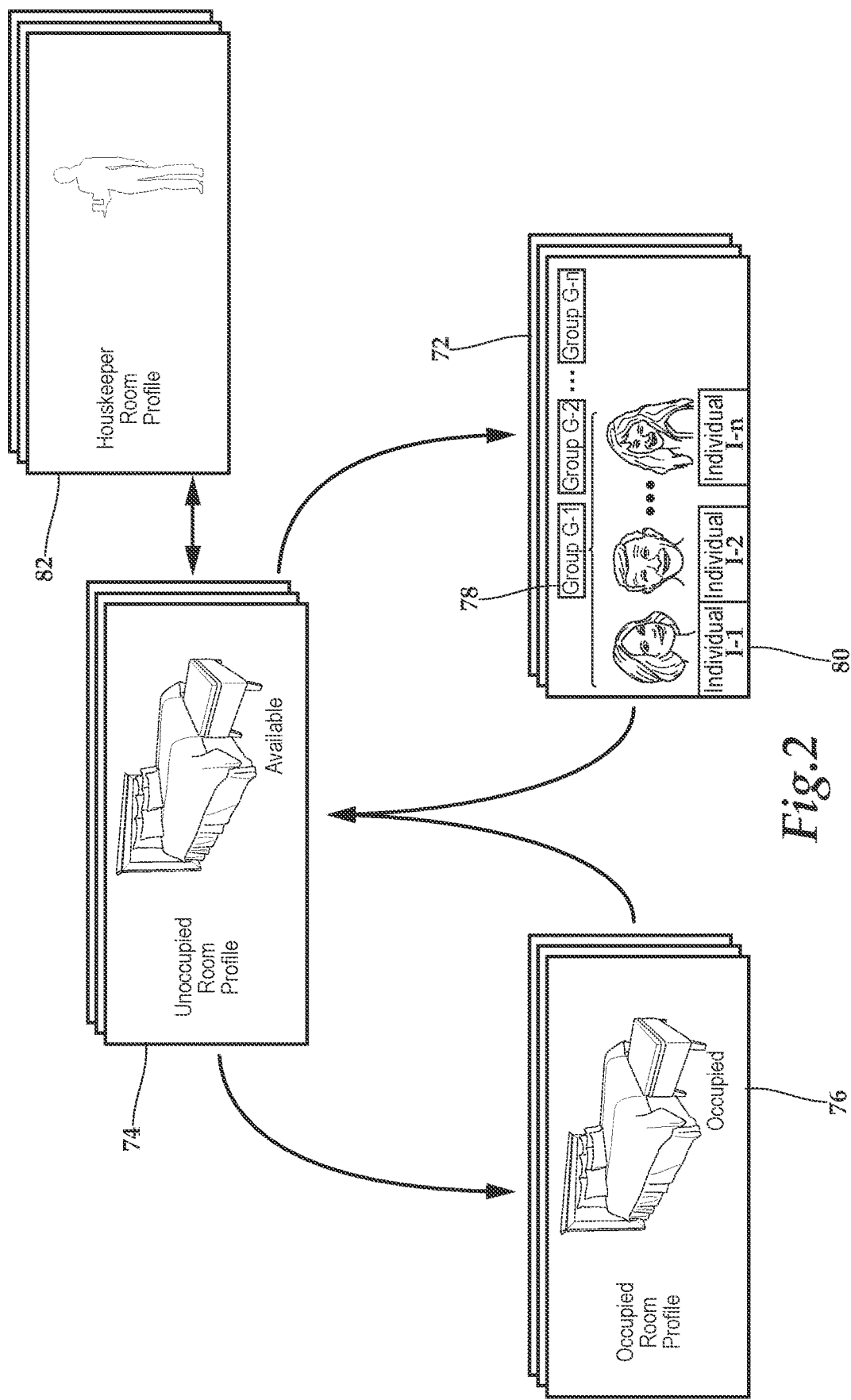
FIG. 2 is a schematic diagram depicting one embodiment of various profiles utilized in the system presented in FIG. 1A and FIG. 1B.

Referring now to FIG. 2, the thermostat 12 utilizes environmental profiles to set environmental conditions, including, in addition to the setpoint temperature, the television 32, the lighting 34, the speaker 36, the window shades 38, the door 40, power outlet functionality, and the services 42, for example. As shown, the thermostat 12 utilizes the unoccupied room profile 74 and the occupied room profile 76 to set the environmental conditions in the rooms R across the property P and even across multiple properties P. The guest preference profile may be activated within the room R to provide guest-specific environmental conditions in the room R associated with the guest. The guest preference profile 72 may include an individual sub-profile 80, a group sub-profile 78, and selection rules. The individual sub-profile 80 providing the environmental conditions and the group sub-profile 78 providing the environmental conditions. The selection rules select between the application of the individual sub-profile 80 and the group sub-profile 78. The group sub-profile 78 relates to a hospitality aspect such as group travel relative to the hospitality establishment H, group meeting accommodations relative to the hospitality establishment H, group event accommodations relative to the hospitality establishment H, and the like.

As depicted, the unoccupied room profile 74 is utilized by the thermostat 12 to set the environmental conditions in the room R when the room R is unoccupied and available. The occupied room profile 76 is utilized by the thermostat 12 to set the environmental conditions in the room R when the room R is occupied and unavailable. In one embodiment, alternatively, if the guest preference profile 72 is available, then the guest preference profile 72 is utilized instead of the occupied room profile 76. In one embodiment, the guest preference profile 72 is actuated in the room R occupied by the guest corresponding to the guest preference profile 72 and the particular guest preference profile 72 is actuated in only room R of the hospitality establishment H whereas the unoccupied room profile 74 and the occupied room profile 76 may be utilized across the entire hospitality establishment H in multiple rooms R.

As shown, a housekeeping/maintenance profile 82 may also be utilized. The housekeeping/maintenance profile 82 providing the environmental conditions when a housekeeper or maintenance professional are within the room R, for example. The housekeeping/maintenance profile 82 may be utilized to temporarily override the unoccupied room profile 74 with the housekeeping/maintenance profile. Further, the housekeeping/maintenance profile 82 may be utilized to temporarily override the occupied room profile 76 or the guest preference profile 72 when a housekeeper or maintenance professional is within the room R.

Referring now to FIG. 3A and FIG. 3B, the server 90 may render the map view 70 of the hospitality establishment H based on obtained map data. Additionally, the server 90 may render the map view 70 of the hospitality establishment H with annotations based on the thermostat data 50 as discussed herein. In some embodiments, the map view 70 may include a graphical representation of one or more rooms of the hospitality establishment H that are annotated with thermostat data 50 relative to the physical data 52, the physical quality assurance data 54, the program data 56, the program quality assurance data 58, the interactive data 60, the environmental data 62, the identification data 64, and/or the self-diagnostic data 66. The server 90 may utilize the map view 70 to monitor and set environmental conditions across the single property or multiple properties P by establishing the unoccupied room profile 74 and the occupied room profile 76 and propagating the unoccupied room profile 74 and the occupied room profile 76 to the thermostat 12. It should be appreciated that the server 90 may be located on the single property P to serve one or more televisions 32 thereon. Further, it should be appreciated that the server 90 may be remotely located to serve multiple properties P having multiple televisions 32.

Referring to FIG. 3A, the system 10 may be deployed such that the server 90, having a housing 92, is co-located with respect to the thermostats 12-1 . . . 12-n, which are located at property P-1. The server 90 may render the map view 70 of the hospitality establishment H that may be annotated with the thermostat data 50 as discussed herein. In this respect, the server 90 may propagate the unoccupied room profile 74 and occupied room profile 76 to the thermostats 12-1 . . . 12-n.

Referring to FIG. 3B, the system 10 may be deployed such that the server 90, having the housing 92, is located remotely within a cloud C relative to the thermostats 12-1 . . . 12-n, which are located at the properties P-1 through P-n. In particular, the server 90 may be located remotely relative to the thermostats 12-1 . . . 12-n such that a property headend 94-1 . . . 94-n is interposed between the server 90 and the thermostats 12-1 12-n. As shown, in this implementation, the property headend 94-1 . . . 94-n is co-located with the thermostats 12-1 . . . 12-n at a respective property, P-1 through P-n. The server 90 may render the map view 70 of the hospitality establishment H that may be annotated with the thermostat data 50 as discussed herein. Further, the server 90 may be utilized to monitor and set the environmental conditions across the properties P-1 . . . P-n. In this respect, the server 90 may propagate the unoccupied room profile 74 and the occupied room profile 76 to the thermostats 12-1 . . . 12-n across the properties P-1 . . . P-n.

Referring to FIG. 4A and FIG. 4B, the thermostat 12 may be a wall-mounted unit that is an information appliance device that generally contains convenience and data functionality in addition to monitoring and controlling heating and cooling in the room R or other environment to a setpoint temperature. The thermostat 12 includes the housing 14 having a front wall 100, a rear wall 102, a side wall 104, a side wall 106, a top wall 108, and a bottom base 110. It should be appreciated that front wall, rear wall, and side wall are relative terms used for descriptive purposes and the orientation and the nomenclature of the walls may vary depending on application. The front wall 100 includes various ports 111, such as physical connections 111-A, 111-B, that provide interfaces for various interfaces, including inputs 112 (please see FIG. 6) and outputs 114 (please see FIG. 6). In one implementation, as illustrated, the physical connection 111-A is an RJ45 port and physical connection 111-B is a USB2 port. It should be appreciated that the configuration of ports may vary with the thermostat depending on application and context. As previously discussed, the thermostat 12 monitors and controls the heating and cooling in the space S or the room R to a setpoint temperature as shown by the interface 16, which may be a display, providing a user interface, that provides the temperature data 18, such as the setpoint temperature [shown as 68° F. (20° C.)] and the actual temperature [shown as 70° F. (21° C.)]. By way of further example, referring to FIG. 5A and FIG. 5B, the thermostat 12 may have no additional ports.

Referring now to FIG. 6, within the housing 14, the inputs 112, the outputs 114, a processor or processors 116, memory 118, storage 120, thermostat circuitry 122, and the interface 16 for a user are interconnected by a busing architecture 124 within a mounting architecture. The processor 116 may process instructions for execution within the computing device, including instructions stored in the memory 118 or in the storage 120. The memory 118 stores information within the computing device. In one implementation, the memory 118 is a volatile memory unit or units. In another implementation, the memory 118 is a non-volatile memory unit or units. The storage 120 provides capacity that is capable of providing mass storage for the thermostat 12 and store, for example, the configuration profile (see configuration profile 22 of FIG. 1A). The various inputs 112 and outputs 114 provide connections to and from the computing device, wherein the inputs 112 are the signals or data received by the thermostat 12, and the outputs 114 are the signals or data sent from the thermostat 12.

A transceiver or transceivers 126 is associated with the thermostat 12 and communicatively disposed with the busing architecture 124. As shown the transceiver 126 may be internal, external, or a combination thereof to the housing. Further, the transceiver 126 may be a transmitter/receiver, receiver, or an antenna for example. Communication between various amenities in the hotel room and the thermostat 12 may be enabled by a variety of wireless methodologies employed by the transceiver 126, including 802.11, 3G, 4G, Edge, WiFi, ZigBee, near field communications (NFC), Bluetooth low energy and Bluetooth, for example. Also, infrared (IR) may be utilized. As previously discussed, the transceiver 126 is configured to be joined in network communication with an environmental amenity or amenities that are co-located within the room of the respective thermostat 12.

In one embodiment, the storage 120 stores the unoccupied room profile 74, the occupied room profile 76, and the guest preference profile 72. The thermostat 12 may receive the unoccupied room profile 74, the occupied room profile 76, and the guest preference profile 72 by way of the transceiver 126 or any of the data connections discussed above, including couplings facilitated by the physical connections 111-A, 111-B. The memory 118 and the storage 120 are accessible to the processor 116 and include processor-executable instructions that, when executed, cause the processor 116 to execute a series of operations. The processor-executable instructions cause the processor 116 to analyze the thermostat data 50 for defaults and store resultant self-diagnostic data. The processor-executable instructions also cause the processor 116 to store the thermostat data 50. The processor-executable instructions may also cause the processor 116 to send the thermostat data 50, or a portion thereof, and to send the self-diagnostic data 66 either separately or with and as part of the thermostat data 50. The thermostat data 50 may be sent periodically or continuously or in response to a request from the server 90, for example.

In one implementation, the processor-executable instructions also cause the processor 116 to send environmental control information consistent with the unoccupied room profile 74 via the transceiver 126 to the environmental amenity when the room R is unoccupied. Unless the thermostat 12 is in receipt of an applicable guest preference profile 72, the processor-executable instructions cause the processor 116 to send environmental control information consistent with the occupied room profile 76 via the transceiver 126 to the environmental amenity when the room R is unoccupied. Upon receipt of the guest preference profile 72, the processor-executable instructions cause the processor 116 to send environmental control information consistent with the guest preference profile 72 via the transceiver 126 to the environmental amenity when the room R is unoccupied. When the housekeeping/maintenance profile 82 is applicable, the processor-executable instructions may cause the processor to temporarily override the unoccupied room profile 74, the occupied room profile 76, or the guest preference profile 72 with the housekeeping/maintenance profile 82.

Figure 7:
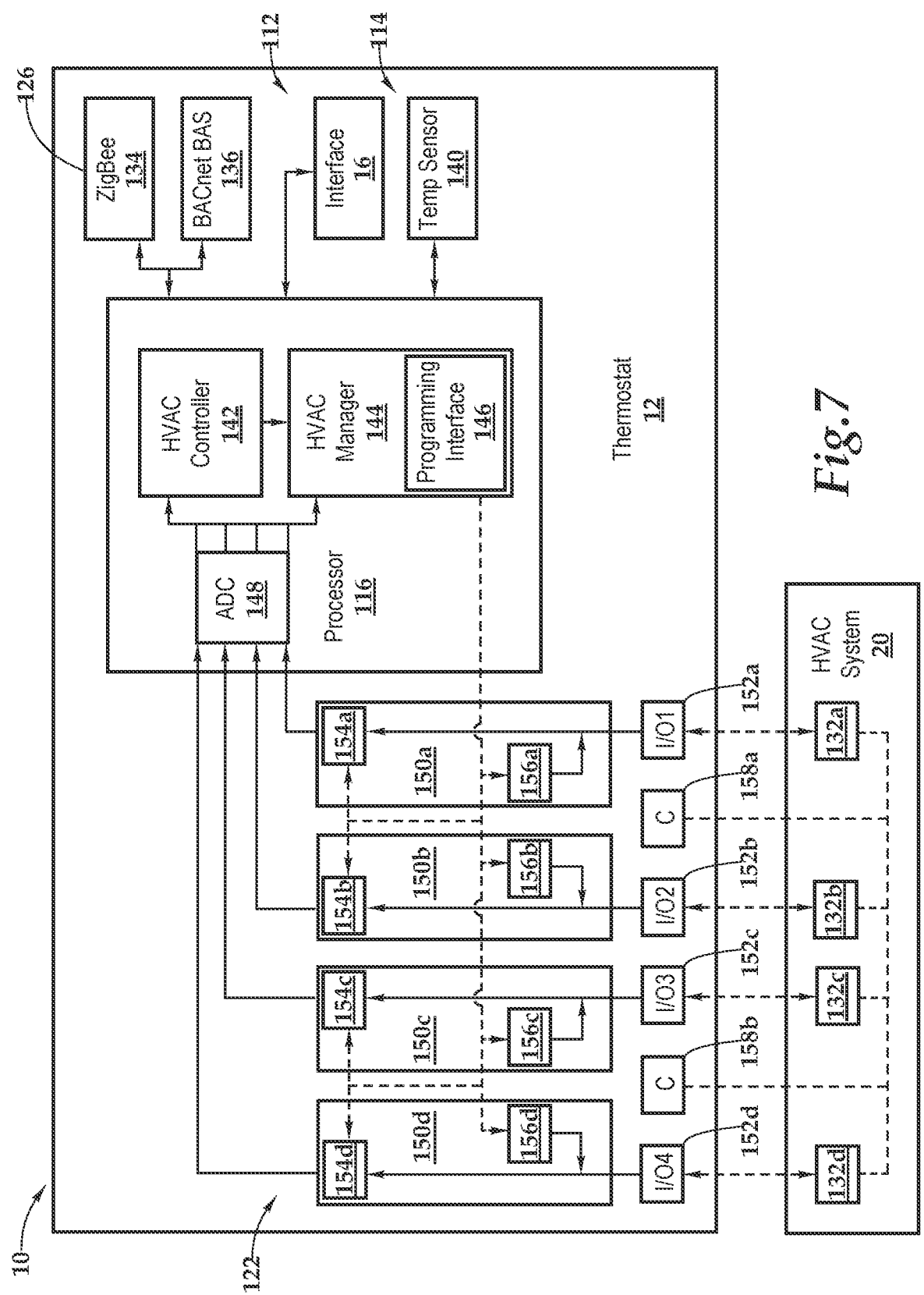
FIG. 7 is a functional block diagram depicting one operational embodiment of a portion of the thermostat shown in FIG. 6.

FIG. 7 depicts another operational embodiment of a portion of the thermostat 12 shown in FIG. 6. In this operational embodiment, the thermostat 12 is located in communication with the HVAC system 20, which may be servicing the space P and/or the hotel H, for example. The HVAC system includes terminal connections 132a, 132b, 132c, 132d providing an interface to various components of the HVAC system 20, including cooling, heating, humidity, and electronic air cleaning, for example. The terminal connections 132a, 132b, 132c, 132d are provided by way of nonlimiting example and it should be appreciated that the number and configuration of terminal connections may vary depending on the HVAC system 20 and application.

As shown, the thermostat circuitry 122 is interposed between the processor 116 and the HVAC system 20. The transceiver 126 communicates with the processor 116 and the transceiver 126 is depicted as a ZigBee antenna 134 in this embodiment. The inputs 112 and the outputs 114 to the thermostat 12 include a wired input/output device 136, the interface 16 for a user, and a temperature sensor 140.

In the illustrated embodiment, the processor 116 includes an HVAC controller 142, an HVAC manager 144 having a programming interface 146, and an analog-to-digital (ADC) converter 148. The thermostat circuitry 122 includes interface circuits 150a, 150b, 150c, 150d coupled to terminal interfaces 152a, 152b, 152c, 152d. Each of the interface circuits 150a, 150b, 150c, 150d have an amplification circuit 154a, 154b, 154c, 154d and an input/output circuit 156a, 156b, 156c, 156d.

The processor 116 may execute machine-readable instructions stored in memory on behalf of the thermostat 12. By way of example, the processor 116 may include a microprocessor having one or more cores, microcontroller, application-specific integrated circuit (ASIC), digital signal processor, digital logic devices configured to execute as a state machine, analog circuits configured to execute as a state machine, or a combination of the above, for example. The processor 116 stores instructions that may include at least one of HVAC controller logic embodied in the HVAC controller 142 and configurable input and output manager logic embodied in HVAC manager 144. In one embodiment, the HVAC manager may include the programming interface 146, which is configured to communicate with the thermostat 12 and provide process-executable instructions thereto by way of non-transitory memory accessible to the processor 116.

The HVAC controller 142 is configured to receive and store user selectable configuration parameters for configuring, via the HVAC manager 144, the terminal connections 132a, 132b, 132c, 132d of the HVAC system 20 as part of the monitoring and controlling of heating and cooling in a room or other environment to a setpoint temperature. The HVAC controller 142 communicates the various configuration parameters and setpoint temperature to the HVAC manager 144, which may also receive configuration parameters from the programming interface 146.

In the illustrated embodiment, the HVAC manager 144 generates and outputs a group of configuration control signals for each of the input/output circuits 156a, 156b, 156c, 156d and each associated amplification circuit 154a, 154b, 154c, 154d of the interface circuits 150a, 150b, 150c, 150d based on the parameters to communicate with the HVAC system 20. Once the terminal interfaces 152a, 152b, 152c, 152d have been configured for a respective input or output interface signal type by the interface circuits 150a, 150b, 150c, 150d, the amplification circuits 154a, 154b, 154c, 154d may employ one or more of the configuration control signals to scale and normalize the feedback signals from the respective terminal interfaces 152a, 152b, 152c, 152d to the interface circuits 150a, 150b, 150c, 150d, which, in turn, drive signals to the ADC 148, which, as mentioned, forms a portion of the processor 116. The ADC 148 converts the feedback signal to a multi-bit digital signal that be provided to or stored in memory associated with the processor 116 for access by both the HVAC controller 142 and the HVAC manager 144 for further processing. As shown in the implementation presented in FIG. 7, the thermostat 12 may also include one or more common, neutral return or earth ground terminals 158a and 158b for connecting to a respective common, neutral return or earth ground connection of the HVAC system 20, for example.

As mentioned hereinabove, in one implementation, the thermostat 12 includes the transceiver 126, shown as the ZigBee antenna 134. The thermostat 12 may also include the wired input/output device 136 that may employ a standard network communication protocol, such as BACnet™ or other network protocol, for enabling signal communication to and from the thermostat 12. The thermostat 12 may further include the interface 16 for a user coupled to the processor 116 via a standard bus or other bi-directional parallel or serial communication protocol connection. The interface 16 for a user may be a standard touch screen or combination of a keyboard and display, or other input/output device. When executing instructions provided by a user or programming software or firmware contained in a setup or configuration application, for example, the processor 116 may generate and display a screen via the interface 16 for a user that includes a user selectable settings input to enable a user, whether the guest, resident, technician, or thermostat installer, to identify system parameters to the processor 116 pertaining to the HVAC system 20. The temperature sensor 140 provides input regarding the temperature at or near the thermostat 12 within the space S, for example. It should be appreciated that although a particular thermostat architecture is presented in FIG. 7, other architectures are withing the teachings presented herein.

Referring now to FIG. 8, one embodiment of the server 90 as a computing device includes a processor 230, memory 232, storage 234, inputs 236, outputs 238, and a network adaptor 240 interconnected with various busing architectures 242 in a common or distributed, for example, mounting architecture. In other implementations, in the computing device, multiple processors and/or multiple busing architectures may be used, as appropriate, along with multiple memories and types of memory. Further still, in other implementations, multiple computing devices may be provided and operations distributed therebetween. The processor 230 may process instructions for execution within the server 90, including instructions stored in the memory 232 or in the storage 234. The memory 232 stores information within the computing device. In one implementation, the memory 232 is a volatile memory unit or units. In another implementation, the memory 232 is a non-volatile memory unit or units. The storage 234 includes capacity that is capable of providing mass storage for the server 90. The various inputs 236 and outputs 238 provide connections to and from the server 90, wherein the inputs 236 are the signals or data received by the server 90, and the outputs 238 are the signals or data sent from the server 90. The network adaptor 240 couples the server 90 to a network such that the server 90 may be part of a network of computers, a local area network (LAN), a wide area network (WAN), an intranet, a network of networks, or the Internet, for example.

The memory 232 and storage 234 are accessible to the processor 230 and include processor-executable instructions that, when executed, cause the processor 230 to execute a series of operations. In one embodiment, the processor-executable instructions cause the processor to receive the thermostat data 50 from the thermostat 12 as well as receive the self-diagnostic data 66 from the thermostat 12. The processor-executable instructions may then cause the processor 230 to store the thermostat data 50 from the thermostat 12 in a database, which may be associated with the storage 234. The self-diagnostic data 66 from the thermostat 12 may also be caused to be stored in the database. The processor-executable instructions then cause the processor 230 to render the map view 70 of the hospitality establishment H based on obtained map data. As previously discussed, the map view 70 may include a graphical representation of the room R and a plurality of other rooms R at the hospitality establishment H. The processor-executable instructions may then access the database and annotate the graphical representation of the room R with at least a portion of the thermostat data 50.

In some embodiments, the processor-executable instructions cause the processor 230 to render a map view 70 of the hospitality establishment H based on obtained map data and the map view 70 may include a graphical representation of the room and other rooms at the hospitality establishment H. The processor-executable instructions, when executed, may cause the processor 230 to render a 3-D perspective view of the hospitality establishment H, a multi-floor view of the hospitality establishment H, a 2-D top plan view of at least a portion the hospitality establishment H, or the map view 70 of a floor of the hospitality establishment H, for example. The map view 70 may be a virtual model of at least a portion of the physical body of the hospitality establishment H, including a virtual model of the physical body of the hospitality establishment H.

In some embodiments, the processor-executable instructions cause the processor 230 to at least partially integrate or at least partially combine multiple portions of the thermostat data 50 into the graphical representation of the room R. The processor-executable instructions may also include instructions that cause the processor 230 to implement a map application configured to provide a user interface and obtain instructions from a user on the desired map view 70 and annotations.

In some embodiments, the processor-executable instructions cause the processor 230 to select the environmental condition or conditions to control. The processor-executable instructions may also set the environmental condition or conditions. Following the environmental conditions being set, the processor 230 is caused by the processor-executable instructions to propagate the unoccupied room profile 74 and the occupied room profile 76 consistent with the set environmental condition.

Figure 9:
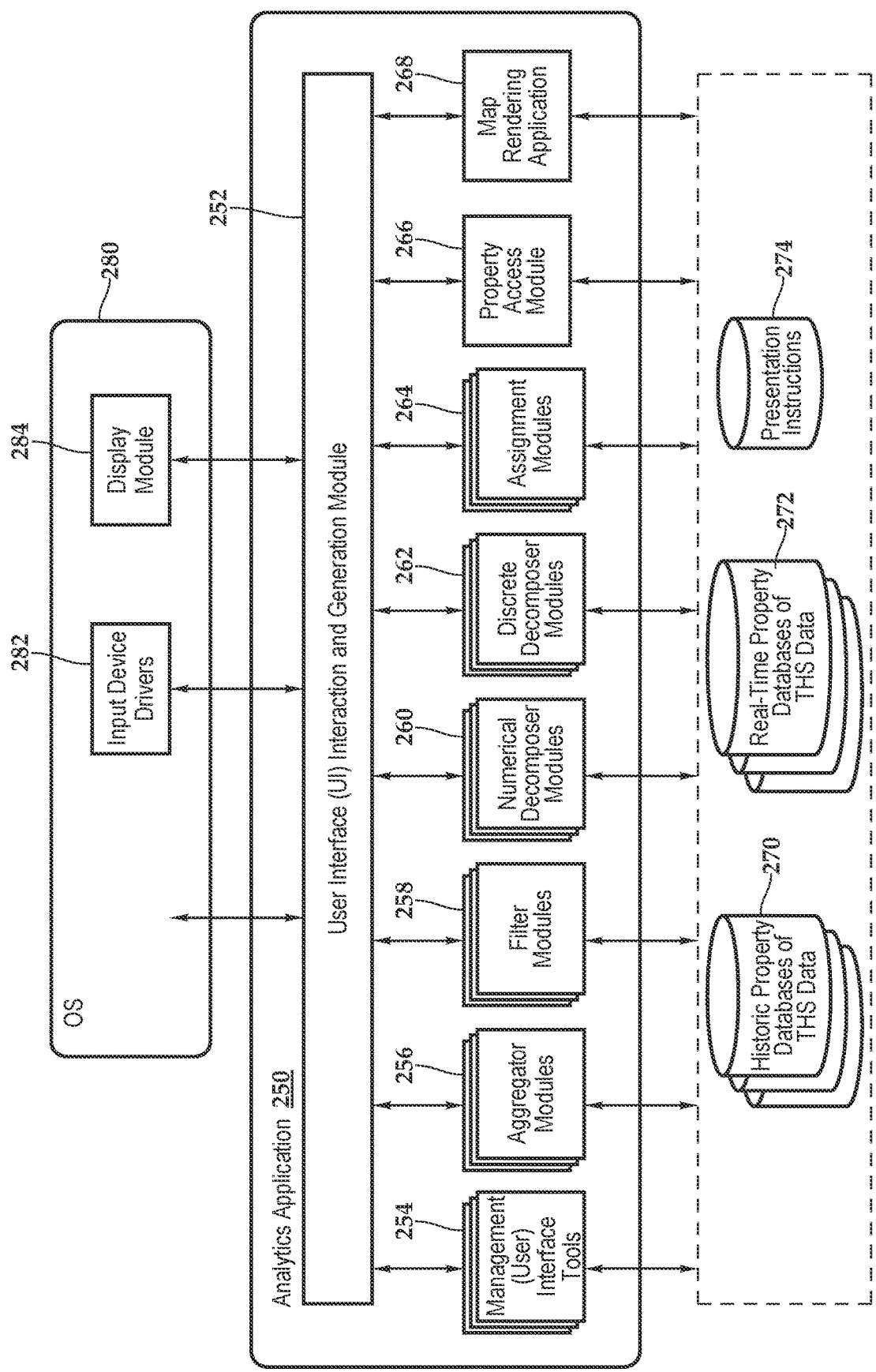
FIG. 9 is a conceptual module diagram depicting a software architecture of an analytics application of some embodiments.

FIG. 9 conceptually illustrates the software architecture of an analytics application 250 of some embodiments that may render the map view 70 of the hospitality establishment H or more generally property P. In some embodiments, the analytics application 250 is a stand-alone application or is integrated into another application, while in other embodiments the application might be implemented within an operating system 280. Furthermore, in some embodiments, the analytics application 250 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The analytics application 250 includes a user interface (UI) interaction and generation module 252, management (user) interface tools 254, aggregator modules 256, filter modules 258, numerical decomposer modules 260, discrete decomposer modules 262, assignment modules 264, property access module 266, and a map rendering application 268. The analytics application 250 has access to historic property databases/storages of thermostat data 270, real-time property databases of thermostat data 272, and presentation instructions 274, which presents instructions from the operation of the analytics operation 250. In some embodiments, storages 270, 272, and 274 are all stored in one physical storage. In other embodiments, the storages 270, 272, 274 are in separate physical storages, or one of the storages is in one physical storage while the other is in a different physical storage.

The UI interaction and generation module 252 generates a user interface that allows the end user to specify parameters that may be utilized to generate an annotated map view of the hospitality establishment H, which may include elements of a heat map. Prior to the generation of an annotated map view of the hospitality establishment H, the aggregator modules 256 may be executed to obtain instances of thermostat data 50. In other instances, the thermostat data 50 is continually provided to the analytics application 250 such that the aggregator modules 256 do not have to obtain instances of thermostat data 50 proactively. The thermostat data 50 may also be filtered by the filter modules 258. The aggregator modules 256 and the filter modules 258 cooperate, in combination, to gather the desired thermostat data.

At this time, the parameters have been established for the annotated map view of the hospitality establishment H by default or by an end user utilizing the management (user) interface tools 254. The numerical decomposer modules 260 may be executed to numerically decompose instances or summaries of thermostat data 50 gathered by the aggregator modules 256 and the filter modules 258 by applying the selected performance characteristic or selected performance characteristics to the instances of the thermostat data 50. The discrete decomposer modules 262 may be executed to containerize the decomposed thermostat data 50. In this manner, multiple containers may be defined that each have a range of values. The assignment modules 264 may be executed to assign a pre-map annotation element to each of the multiple containers. The property access module 266 may be executed to obtain data from the historic property databases of thermostat data 270 or the real-time property databases of thermostat data 272. The map rendering application 268 may be executed to call a map rendering application 300 of FIG. 10, for example.

In the illustrated embodiment, FIG. 9 also includes the operating system 280 that includes input device driver(s) 282 and a display module 284. In some embodiments, as illustrated, the input device drivers 282 and display module 284 are part of the operating system 280 even when the analytics application 250 is an application separate from the operating system 280. The input device drivers 282 may include drivers for translating signals from a keyboard, mouse, touchpad, tablet, touch screen, gyroscope or accelerometer, for example. A user interacts with one or more of these input devices, which send signals to their corresponding device driver. The device driver then translates the signals into user input data that is provided to the UI interaction and generation module 252.

Figure 10:
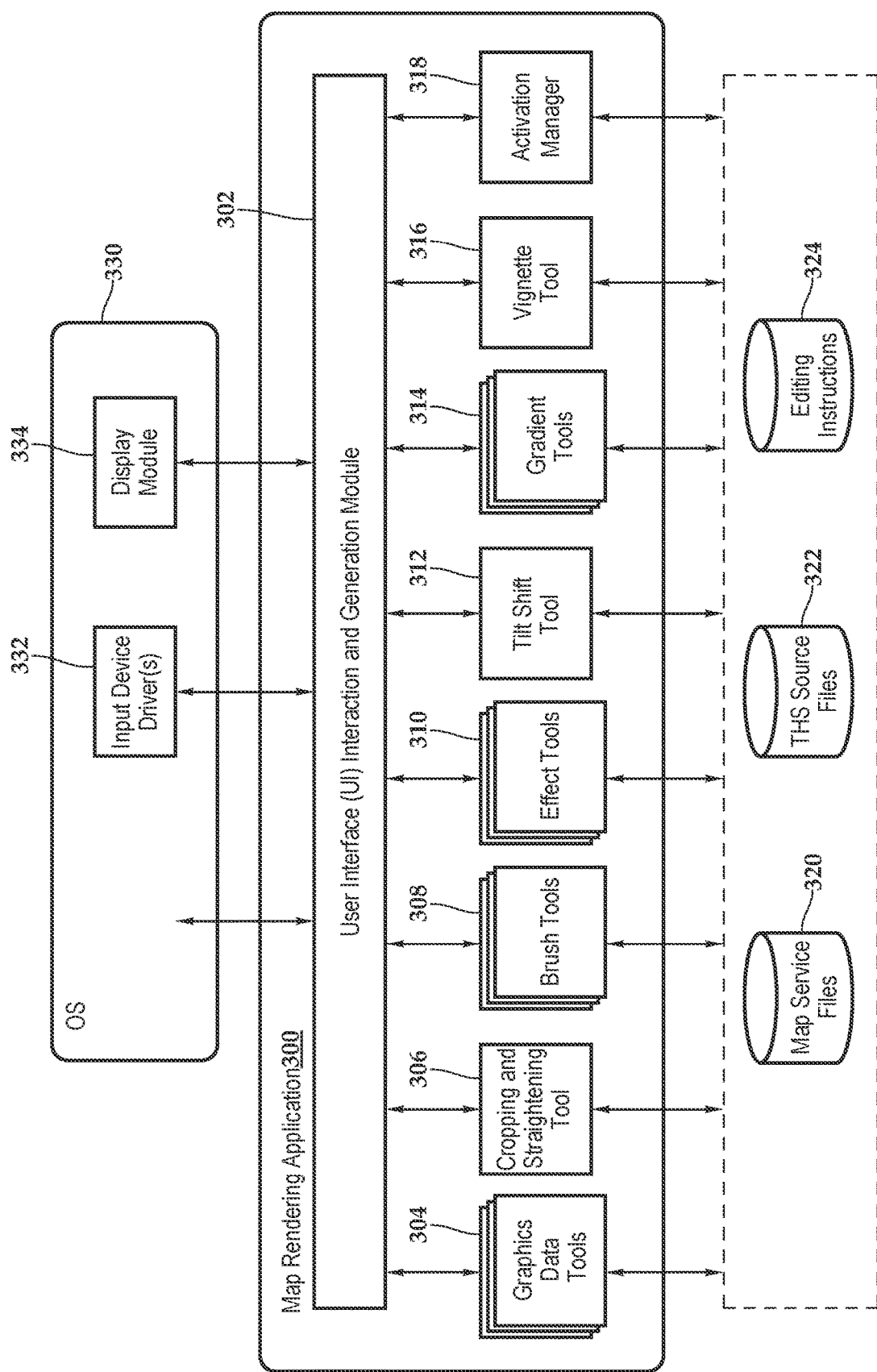
FIG. 10 is a conceptual module diagram depicting a software architecture of a map rendering application of some embodiments.

FIG. 10 conceptually illustrates the software architecture of the map rendering application 300 of some embodiments that may render the map view 70 of the hospitality establishment H. In some embodiments, the map rendering application 300 is a stand-alone application or is integrated into another application, while in other embodiments the application might be implemented within an operating system 330. Furthermore, in some embodiments, the map rendering application 300 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The map rendering application 300 includes a UI interaction and generation module 302, graphics data tools 304, a cropping and straightening tool 306, brush tools 308, effect tools 310, a tilt shift tool 312, gradient tools 314, a vignette tool 316, and an activation manager 318. The image editing application has access to storages including map service files 320, thermostat source files 322, and editing instructions 324. In some embodiments, the map service files 320 may be vector graphics data files with texture identifiers or two or three dimensional map image files specified in one or more map tiles that may be raster-based map tiles, for example. The map service files 320 create a virtual model of the physical body of the hospitality establishment H based on definitions derived from any GIS resources, such as a geodatabase, address location map document or geoprocess model, or any two-dimensional or three-dimensional CAD-based drawings and plans.

The thermostat source files 322 store operational instructions for processing thermostat data 50. The editing instructions 324 store the image editing operations that the map rendering application 300 performs as a set of instructions. The map rendering application 300 uses these set of instructions to generate new images based on the original data stored in the source files. In some embodiments, the map image files and/or media content data are stored as .mov, .avi, .jpg, .png, .gif, pdf, .mp3, .bmp, .wav, .txt, .tiff, etc. files in the map service files 320 and thermostat source files 322. In some embodiments, storages 320, 322, and 324 are all stored in one physical storage. In other embodiments, the storages 320, 322, 324 are in separate physical storages, or one of the storages is in one physical storage while the other is in a different physical storage.

In the illustrated embodiment, FIG. 10 also includes the operating system 330 that includes input device driver(s) 332 and a display module 334. In some embodiments, as illustrated, the device drivers 332 and display module 334 are part of the operating system 330 even when the image editing application is an application separate from the operating system. The input device drivers 332 may include drivers for translating signals from a keyboard, mouse, touchpad, tablet, touch screen, gyroscope, accelerometer, etc. A user interacts with one or more of these input devices, which send signals to their corresponding input device driver 332. The input device driver 332 then translates the signals into user input data that is provided to the UI interaction and generation module 302.

The present application describes a graphical user interface that provides users with numerous ways to perform different sets of operations and functionalities. By either executing a pre-determined series of editing instructions on a pre-determined set of media source files or receiving a selection of media processing operations, the present map rendering application 300 provides for the map view 70 of the hospitality establishment H with the appropriate annotations of the thermostat data 50.

Figure 11:
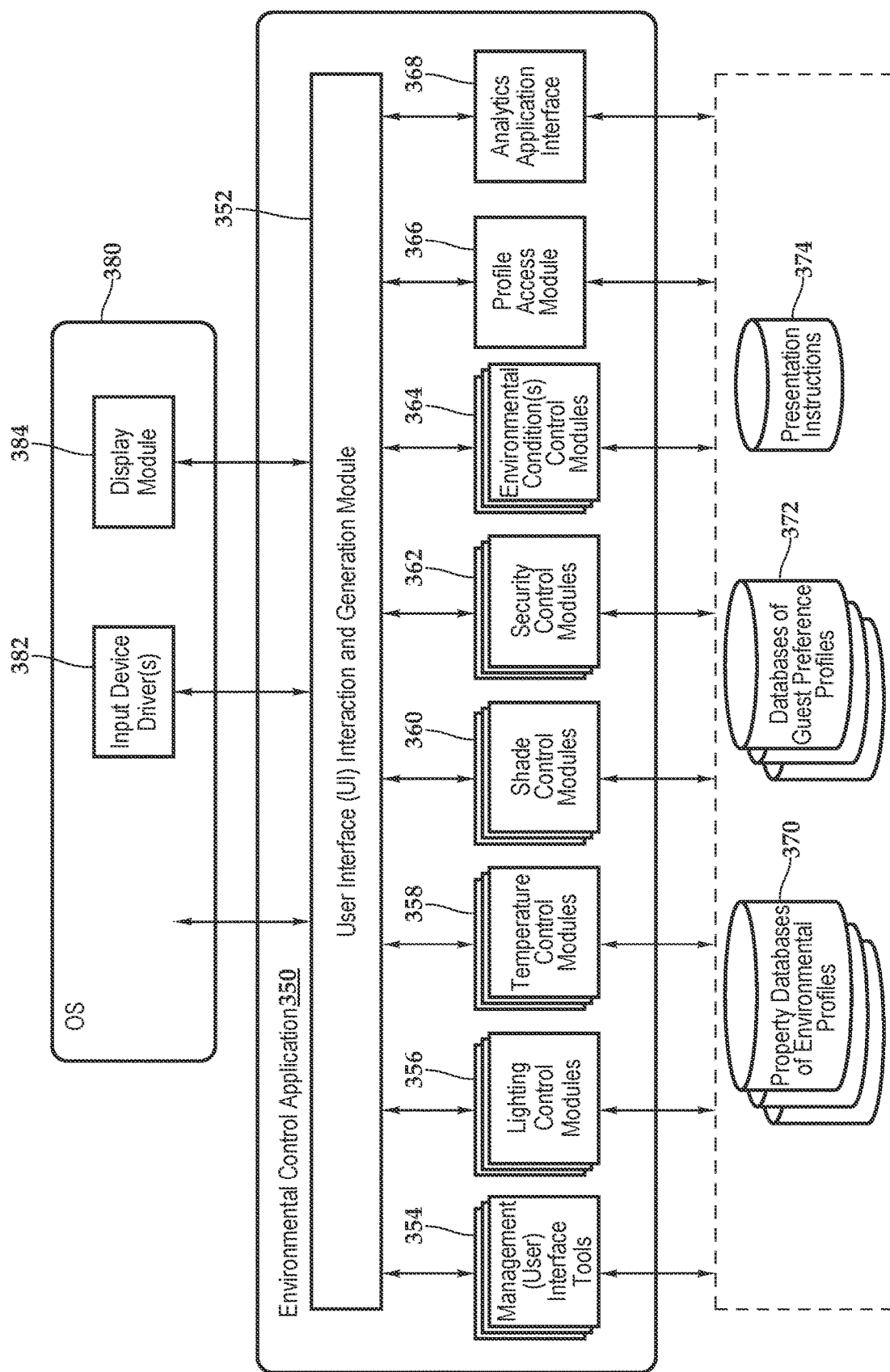
FIG. 11 is a conceptual module diagram depicting a software architecture of an environmental control application of some embodiments.

FIG. 11 conceptually illustrates the software architecture of an environmental control application 350 of some embodiments that may utilize the map view 70 or other application to set the environmental profiles and therefore environmental conditions with the hospitality establishment H and across hospitality properties or more generally across properties. In some embodiments, the environmental control application 350 is a stand-alone application or is integrated into another application, while in other embodiments the application might be implemented within an operating system 380. Furthermore, in some embodiments, the environmental control application 350 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The environmental control application 350 includes a UI interaction and generation module 352, management (user) interface tools 354, lighting control modules 356, temperature control modules 358, shade control modules 360, security control modules 362, environmental conditions(s) control modules 364, profile access module 366, and analytics application interface 368. The profile access module 366 has access to property databases of environmental profiles 370, databases of guest preference profiles 372, and presentation instructions 374. In some embodiments, the property databases of environmental profiles store unoccupied room profiles 74 and associated data as well as occupied room profiles 76 and associated data. The databases of guest preference profiles 372 store guest preference profiles 72 and associated data.

The management (user) interface tools 354 store operational instructions for monitoring and setting environmental conditions via the analytics application 250 and the associated map rendering application 300 by way of the analytics application interface 368. The environmental control application 350 uses the lighting control modules 356, the temperature control modules 358, the shade control modules 360, the security control modules 362 and the environmental condition(s) control modules 362 to various control variables to generate, establish, and monitor the environmental profiles, including the unoccupied room profiles 74, the occupied room profiles 76, and guest preference profiles 72.

In the illustrated embodiment, FIG. 11 also includes the operating system 380 that includes input device driver(s) 382 and a display module 384. In some embodiments, as illustrated, the device drivers 382 and display module 384 are part of the operating system 380 even when the image editing application is an application separate from the operating system. The input device drivers 382 may include drivers for translating signals from a keyboard, mouse, touchpad, tablet, touch screen, gyroscope, accelerometer, etc. A user interacts with one or more of these input devices, which send signals to their corresponding device driver. The device driver then translates the signals into user input data that is provided to the UI interaction and generation module 352.

The present application describes a graphical user interface that provides users with numerous ways to perform different sets of operations and functionalities. By either executing a pre-determined series of editing instructions on a pre-determined set of media source files or receiving a selection of media processing operations, the present environmental control application 350 provides for the map view 70 of the hospitality establishment H with the appropriate annotations of the thermostat data 50 to monitor the environmental conditions and set the environmental conditions in one hospitality property or across multiple hospitality properties prior to propagating unoccupied room profiles 74 and occupied room profiles 76.

Figure 12A:
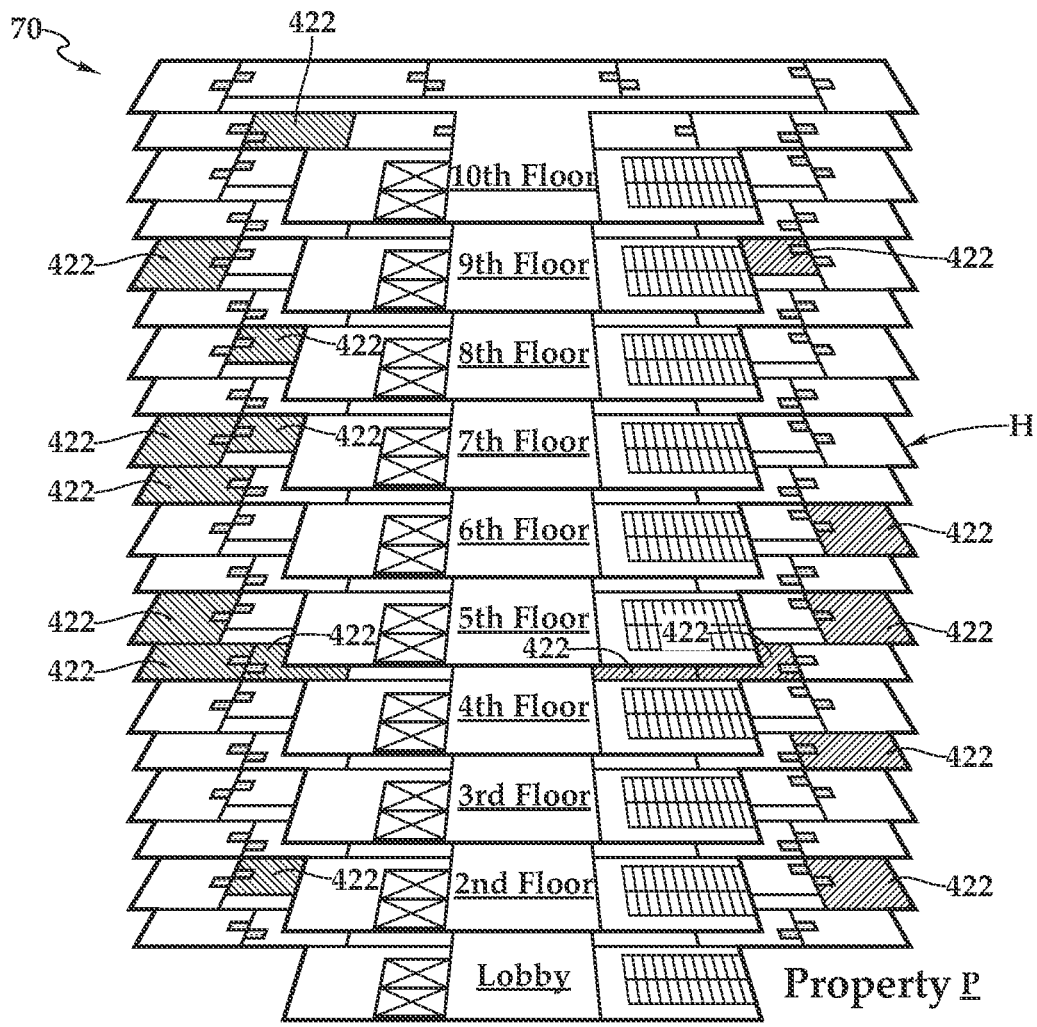
FIG. 12A is a schematic diagram depicting one embodiment of a map representation of a hospitality lodging establishment utilizing one embodiment of a hospitality property management tool presented herein.
Figure 12B:
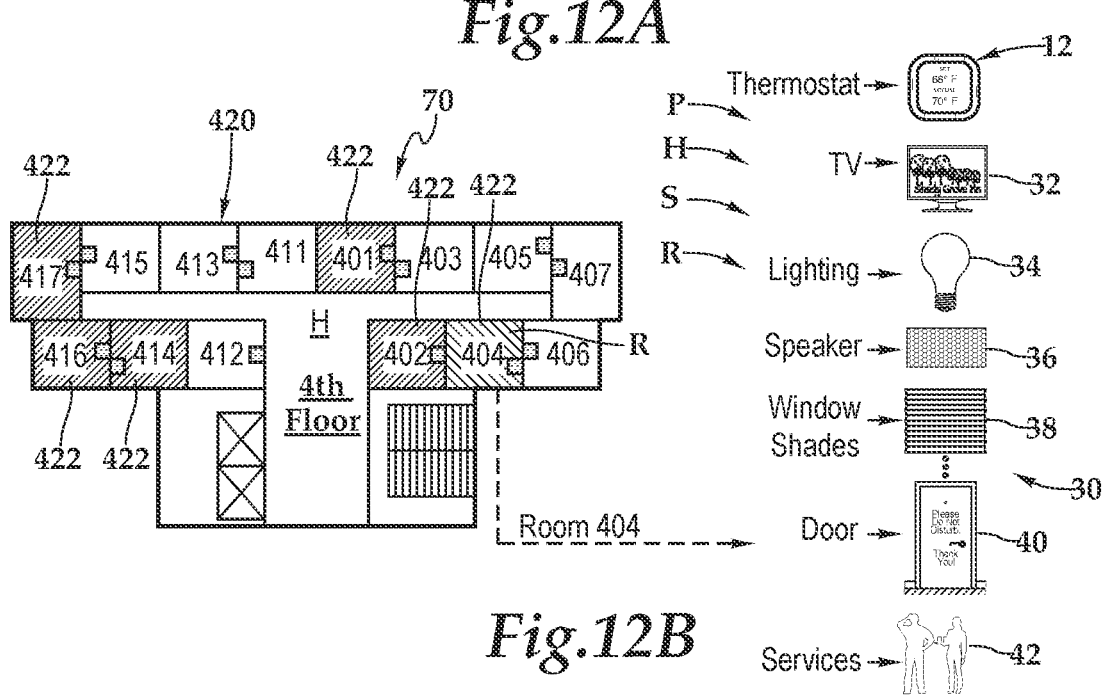
FIG. 12B is a schematic diagram depicting one embodiment of a map representation of a floor of the hospitality lodging establishment presented in FIG. 12A.

Referring now to FIG. 12A and FIG. 12B, in one implementation, property monitoring and optimization is provided in the form of a database, or as shown, in the map view 70 of the hospitality establishment H of the property P including a graphical presentation 420 of a floor of the hospitality establishment H, wherein particular hotel rooms with the thermostat data 50 historically and in substantially real time permits a user or manager to select the desired information and make optimal property management decisions, including establishing and setting environmental controls over one or more properties. In particular, color-coding and hue assignment adds additional understanding and visibility into housekeeping and maintenance conditions as well as use. By way of example and not by way of limitation, the hospitality establishment is graphical and depicted as having a lobby and nine additional floors, which are lobby, $2^{nd}$ floor, $3^{rd}$ floor, etc. For each floor, such as the $4^{th}$ floor, a floor layout is shown with rooms, such as rooms 401 through 407 and 411 through 417. In FIGS. 12A and 12B, by collecting the substantially real time and the historic thermostat data 50 from the field, a map may be shown depicting all rooms that are occupied. In particular, room 404 from FIG. 12B is highlighted to inspect the occupation status and occupied room profile, with various amenities 30, which are depicted as the thermostat 12 representing temperature control, the television 32, the lighting 34, the speaker 36, the window shades 38, the security 40, which is depicted as a door indication for "Please Do Not Disturb.", and the services 42. With this information and knowledge of the issue, management may appropriately administer the strategy for organizing and coordinating the resources of the property, including the environmental conditions. As mentioned, it should be appreciated that other types of databases and charts may be prepared from the substantially real-time information collected.

As shown, by way of example, the status of Room 404 is being examined as the environmental conditions across each highlighted room 422 and the hotel H are being monitored and studied to establish the unoccupied room profile and the occupied room profile. Management uses the map view 70 to gather real time information about the status of the rooms and properties and reports on the environmental conditions. To view the thermostat data 50 captured from each thermostat 12 in each room, the map view users can select a room from the map and appropriately click or tap on the rooms and then select the thermostat data 50 or other processing operations requested.

The system 10 presented herein provides for the management of hospitality real estate and to the operation, control, and oversight of hospitality properties, such as lodging establishments, motels, or hotels, for example. In one embodiment, a web-hosted, cloud-based property monitoring and troubleshooting tool is furnished that provides a graphical presentation of the hospitality properties with historic and real time room and equipment status. By way of example and not by way of limitation, the user may select to annotate the map view with rooms and equipment online/offline, rooms and equipment percentage online status, groups by percentage, rooms and equipment that are powered off, rooms and equipment TV control status and TV types by model number, rooms and equipment with TV output errors or rooms and equipment with HDCP errors. Also, possible instructions include show rooms and equipment by firmware version numbers, show rooms and equipment by UI software version numbers, show rooms and equipment by settings version numbers, show rooms that are tuned to the welcome channel, show rooms that are tuned to a TV channel and group them by channels, show rooms with program guide trouble, show room thermostat memory usage, show room self-test results, show rooms with self-test failures, force self-test, view the self-test result, view rooms with failure, force software update, force UI software update, force configuration change or force power state change. The user may utilize the annotated map view to effect commands to one or more rooms including online/offline, network address, MAC address, hardware configuration and identifiers, software configuration and versions, TV connection status, control interface and HDMI interface or unit up-time and health reports, for example. The user may also utilize the system for full access to debug console ports on each thermostat. As mentioned, the historic thermostat data 50 may be viewed by the property or properties P, the room or rooms R, with user selectable constraints such as data and time. Further, the system 10 may be utilized to monitor the installation process. Further still, the system 10 may be utilized to monitor and establish environmental conditions across a property and multiple properties.

Figure 13:
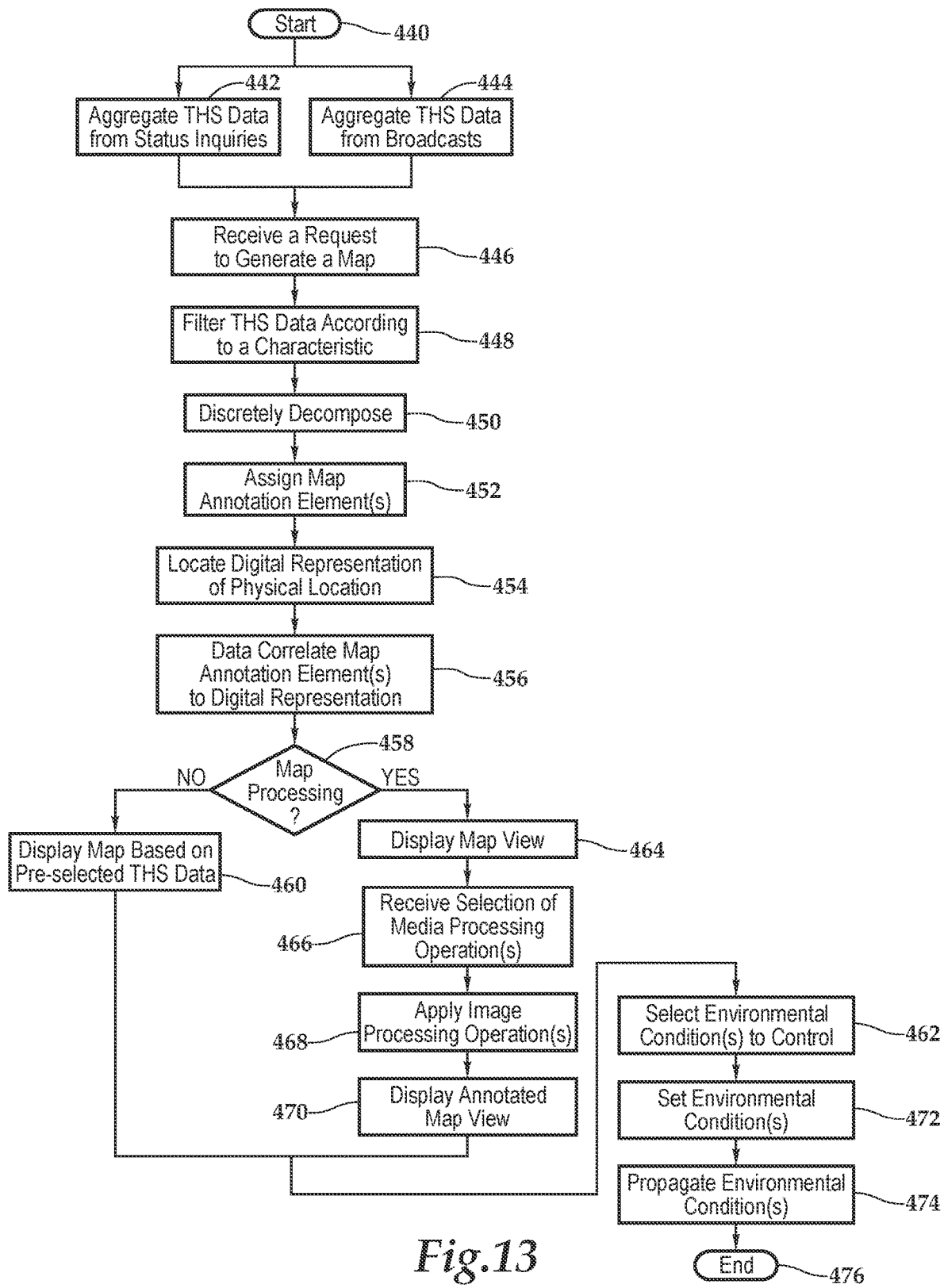
FIG. 13 is a flow chart depicting one embodiment of a method for providing hospitality property management according to the teachings presented herein.

Referring now to FIG. 13, one embodiment of a method for utilizing property management tools for the operation, control, and oversight of properties shown as hospitality properties, such as lodging establishments, motels, or hotels, for example, is depicted. The methodology starts at block 440 and progresses through blocks 442 and 444 where, respectively the thermostat data 50 is aggregated from status inquiries from the server to the thermostats and aggregated from thermostats broadcasting the thermostat data 50. At block 446, the server receives a request to generate the map view 70 of a particular hospitality property. At block 448, the server filters the aggregated thermostat data according to a characteristic or characteristics. At blocks 450 and 452, the thermostat data 50 is discretely decomposed and assigned annotation elements. At block 454, the digital representation of the physical location, e.g., the hospitality property, is located and at block 456, the data correlation of the map annotation elements to the digital representation occurs.

At decision block 458, if the map processing including any applied annotations are based on a pre-selected or pre-stored or pre-defined criteria, then the methodology advances to block 460 where the appropriate map view 70 is rendered prior to block 462, the methodology continues. On the other hand, at the decision block 458, if user input will be sought on the map view 70 and annotations, then the methodology displays the map view at block 464. Then at block 466, the server receives selection of media processing operations from the user and then applies the image processing operations at block 468. The media processing operations may include, for example, selecting the media to be displayed and various luminance and color properties and such to provide further visibility into the map view 70. At block 470, the map view with annotations is rendered prior to the methodology continuing at block 462. At the block 462, the environmental conditions to control are selected and then set at block 472. At block 474, the environmental conditions are propagated throughout the hospitality property or hospitality properties by establishing the unoccupied room profile and occupied room profile prior to the methodology ending at block 476.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for property management, the system comprising:
 a plurality of thermostats located in a respective plurality of rooms at a property having the plurality of rooms;
 an unoccupied room profile providing environmental conditions in each of the plurality of rooms when unoccupied, the environmental conditions including lighting;
 an occupied room profile providing the environmental conditions in each of the plurality of rooms when occupied; and
 each of the plurality of thermostats including:
  a housing securing thermostat circuitry, a processor, memory, storage, and a transceiver therein,
  a busing architecture communicatively interconnecting the thermostat circuitry, the processor, the memory, the storage, and the transceiver,
  the thermostat circuity configured to monitor and control heating and cooling in a respective room of the plurality of rooms,
  the storage storing the unoccupied room profile and the occupied room profile,
  the transceiver configured to be joined in network communication with an environmental amenity, the environmental amenity being co-located within the room of a respective thermostat, the environmental amenity controlling the lighting, and
  the memory accessible to the processor, the memory including processor-executable instructions that, when executed, cause the processor to:
   send environmental control information consistent with the unoccupied room profile via the transceiver to the environmental amenity when the room is unoccupied,
   upon receipt of a preference profile, send the environmental control information consistent with the occupied room profile via the transceiver to the environmental amenity when the room is unoccupied, the preference profile providing the environmental conditions in the room when occupied by a particular individual corresponding to the preference profile, and
   upon receipt of the preference profile, send the environmental control information consistent with the preference profile via the transceiver to the environmental amenity when the room is unoccupied.

2. The system as recited in claim 1, wherein the environmental conditions further include temperature.

3. The system as recited in claim 1, wherein the environmental conditions further comprise a condition selected from the group consisting of temperature, shade, security locks, and power outlets.

4. The system as recited in claim 1, wherein the preference profile further comprises an individual sub-profile, a group sub-profile, and selection rules, the individual sub-profile providing the environmental conditions, the group sub-profile providing the environmental conditions, the selection rules selecting between the application of the individual sub-profile and the group sub-profile.

5. The system as recited in claim 1, further comprising:
 a housekeeping/maintenance profile, the housekeeping/maintenance profile providing the environmental conditions; and
 the memory accessible to the processor, the memory including processor-executable instructions that, when executed, cause the processor to temporarily override the unoccupied room profile with the housekeeping/maintenance profile.

6. The system as recited in claim 1, further comprising:
 a housekeeping/maintenance profile, the housekeeping/maintenance profile providing the environmental conditions; and
 the memory accessible to the processor, the memory including processor-executable instructions that, when executed, cause the processor to temporarily override the occupied room profile with the housekeeping/maintenance profile.

7. The system as recited in claim 1, further comprising:
a housekeeping/maintenance profile, the housekeeping/maintenance profile providing the environmental conditions; and
the memory accessible to the processor, the memory including processor-executable instructions that, when executed, cause the processor to temporarily override the preference profile with the housekeeping/maintenance profile.

8. The system as recited in claim 1, wherein the preference profile is actuated in the room occupied by the particular individual corresponding to the preference profile.

9. The system as recited in claim 1, wherein the particular preference profile is actuated in only one room of the plurality of rooms.

10. The system as recited in claim 1, wherein each of the plurality of thermostats further comprise a data connection interconnected in the busing architecture.

11. The system as recited in claim 10, wherein the unoccupied room profile and the occupied room profile are received via the data connection.

12. The system as recited in claim 1, wherein the unoccupied room profile and the occupied room profile are received via the transceiver.

13. The system as recited in claim 1, wherein the transceiver is configured to communicate with a plurality of proximate amenities via a standard selected from the group consisting of infrared (IR), 802.11, 3G, 4G, Edge, Wi-Fi, ZigBee, near field communications (NFC), Bluetooth, and Bluetooth low energy.

14. The system as recited in claim 1, wherein the property is selected from the group consisting of hospitality environments, educational campuses, hospital campuses, office buildings, multi-unit dwellings, sport facilities and shopping malls, whether a single story, multiple stories, or a combination thereof.

15. The system as recited in claim 1, wherein the environmental data is selected from the group consisting of amenity interaction, lighting status, thermostat status, window shades status, and door status.

16. The system as recited in claim 1, wherein the environmental data further comprises heating cycle data.

17. The system as recited in claim 1, wherein the environmental data further comprises cooling cycle data.

18. The system as recited in claim 1, wherein the environmental data further comprises setpoint temperature data.

19. A system for property management, the system comprising:
a plurality of thermostats located in a respective plurality of rooms at a property having the plurality of rooms;
an unoccupied room profile providing environmental conditions in each of the plurality of rooms when unoccupied, the environmental conditions including temperature;
an occupied room profile providing the environmental conditions in each of the plurality of rooms when occupied; and
each of the plurality of thermostats including:
a housing securing thermostat circuitry, a processor, memory, storage, and a transceiver therein,
a busing architecture communicatively interconnecting the thermostat circuitry, the processor, the memory, the storage, and the transceiver,
the thermostat circuity configured to monitor and control heating and cooling in a respective room of the plurality of rooms,
the storage storing the unoccupied room profile and the occupied room profile,
the transceiver configured to be joined in network communication with an environmental amenity, the environmental amenity being co-located within the room of a respective thermostat, the environmental amenity controlling the temperature, and
the memory accessible to the processor, the memory including processor-executable instructions that, when executed, cause the processor to:
send environmental control information consistent with the unoccupied room profile via the transceiver to the environmental amenity when the room is unoccupied,
upon receipt of a preference profile, send the environmental control information consistent with the occupied room profile via the transceiver to the environmental amenity when the room is unoccupied, the preference profile providing the environmental conditions in the room when occupied by a particular individual corresponding to the preference profile, and
upon receipt of the preference profile, send the environmental control information consistent with the preference profile via the transceiver to the environmental amenity when the room is unoccupied.

20. A system for property management, the system comprising:
a plurality of thermostats located in a respective plurality of rooms at an establishment having the plurality of rooms;
an unoccupied room profile providing environmental conditions in each of the plurality of rooms when unoccupied, the environmental conditions including lighting and temperature;
an occupied room profile providing the environmental conditions in each of the plurality of rooms when occupied;
each of the plurality of thermostats including:
a housing securing thermostat circuitry, a processor, memory, storage, and a transceiver therein,
a busing architecture communicatively interconnecting the thermostat circuitry, the processor, the memory, the storage, and the transceiver,
the thermostat circuity configured to monitor and control heating and cooling in a respective room of the plurality of rooms,
thermostat data including physical data, physical quality assurance data, program data, program quality assurance data, interactive data, environmental data, and identification data,
the physical data being, relative to a thermostat, specifications of hardware and wired connection arrangements at a time of an installation,
the physical quality assurance data being, relative to the thermostat, physical state data of a current condition of the hardware and the wired connections,
the program data being, relative to the thermostat, information about system software and application software,
the program quality assurance data being, relative to the thermostat, software state data of current operations of the system software and the application software, the interactive data being, relative to the thermostat, information about particular individual-display-based interactions with the thermostat, the environmental data being, relative to the thermostat, information about particular individual-non-display-based interactions with the thermostat, the identification data including a location of the thermostat and information derived from the physical data and the program data, the storage storing the unoccupied room profile and the occupied room profile, the transceiver configured to be joined in network communication with an environmental amenity, the environmental amenity being co-located within the room of the respective thermostat, the environmental amenity controlling the temperature, and the memory accessible to the processor, the memory including processor-executable instructions that, when executed, cause the processor to:

analyze the thermostat data for defaults and store resultant self-diagnostic data, store the thermostat data, send the thermostat data, send the self-diagnostic data, send environmental control information consistent with the unoccupied room profile via the transceiver to the environmental amenity when the room is unoccupied, upon receipt of a preference profile, send environmental control information consistent with the occupied room profile via the transceiver to the environmental amenity when the room is unoccupied, the preference profile providing the environmental conditions in the room when occupied by a particular individual corresponding to the preference profile, and upon receipt of the preference profile, send the environmental control information consistent with the preference profile via the transceiver to the environmental amenity when the room is unoccupied; and a server located remote to the room, the server including:

a housing securing inputs, outputs, a processor, memory, and storage therein, a busing architecture communicatively interconnecting the inputs, the outputs, the processor, the memory, and the storage, and the memory accessible to the processor, the memory including processor-executable instructions that, when executed, cause the processor to:

receive the thermostat data from the thermostat, receive the self-diagnostic data from the thermostat, render a map view of the establishment based on obtained map data, the map view including a graphical representation of the room and the plurality of rooms at the establishment, the map view being a virtual model of at least a portion of a physical body of the establishment, annotate the graphical representation of the room with at least a portion of the thermostat data, select the environmental condition to control, set the environmental condition, and propagate the unoccupied room profile and the occupied room profile consistent with the set environmental condition.

21. A system for property management of a property, the system comprising:

a plurality of thermostats located in a respective plurality of rooms at the property;

an unoccupied room profile providing environmental conditions in each of the plurality of rooms when unoccupied, the environmental conditions including lighting and temperature;

an occupied room profile providing the environmental conditions in each of the plurality of rooms when occupied;

each of the plurality of thermostats including:

a housing securing a signal input, a signal output, a processor, memory, storage, and a transceiver therein, a busing architecture communicatively interconnecting the signal input, the signal output, the processor, the memory, the storage, and the transceiver, thermostat data including physical data, physical quality assurance data, program data, program quality assurance data, interactive data, environmental data, and identification data, the physical data being, relative to a thermostat, specifications of hardware and cable connection arrangements at a time of an installation, the physical quality assurance data being, relative to the thermostat, physical state data of a current condition of the hardware and the cable connections, the program data being, relative to the thermostat, information about system software and application software, the program quality assurance data being, relative to the thermostat, software state data of current operations of the system software and the application software, the interactive data being, relative to the thermostat, information about particular individual-display-based interactions with the thermostat, the environmental data being, relative to the thermostat, information about particular individual-non-display-based interactions with the thermostat, the identification data including a location of the thermostat and information derived from the physical data and the program data, the storage storing the unoccupied room profile and the occupied room profile, the transceiver configured to be joined in network communication with an environmental amenity, the environmental amenity being co-located within a room of the respective thermostat, the environmental amenity controlling the environmental condition within the room of the respective thermostat, and the memory accessible to the processor, the memory including processor-executable instructions that, when executed, cause the processor to:

analyze the thermostat data for defaults and store resultant self-diagnostic data, store the thermostat data, send the thermostat data, send the self-diagnostic data, send environmental control information consistent with the unoccupied room profile via the transceiver to the environmental amenity when the room is unoccupied, upon receipt of a preference profile, send the environmental control information consistent with the occupied room profile via the transceiver to the environmental amenity when the room is unoccupied, the preference profile providing the environmental conditions in the room when occupied by a particular individual corresponding to the preference profile, and upon receipt of the preference profile, send the environmental control information consistent with the preference profile via the transceiver to the environmental amenity when the room is unoccupied; and a server located remote to the room, the server including:
a housing securing inputs, outputs, a processor, memory, and storage therein,
a busing architecture communicatively interconnecting the inputs, the outputs, the processor, the memory, and the storage, and
the memory accessible to the processor, the memory including processor-executable instructions that, when executed, cause the processor to:

receive the thermostat data from the thermostat, receive the self-diagnostic data from the thermostat, render a map view of the property based on obtained map data, the map view including a graphical representation of the room and the plurality of rooms at the property, the map view being a virtual model of at least a portion of a physical body of the property, annotate the graphical representation of the room with the at least a portion of the thermostat data, select the environmental condition to control, set the environmental condition, and propagate the unoccupied room profile and the occupied room profile consistent with the set environmental condition.

* * * * *